(12) United States Patent
Webb et al.

(10) Patent No.: US 7,433,897 B1
(45) Date of Patent: Oct. 7, 2008

(54) SYSTEMS AND METHODS FOR DATABASE REGISTRATION

(75) Inventors: Sandra S. Webb, Fayetteville, GA (US); Keith R. Harris, Atlanta, GA (US); Ravi R. Devulapalli, Alphareta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 457 days.

(21) Appl. No.: 09/986,168

(22) Filed: Nov. 7, 2001

(51) Int. Cl.
G06F 17/30 (2006.01)
G06F 12/00 (2006.01)
G06F 17/00 (2006.01)

(52) U.S. Cl. .................... 707/200; 707/100; 705/17
(58) Field of Classification Search .................. 707/9, 707/1, 102, 10, 201, 6, 103, 104, 204; 705/27, 705/40, 39, 21, 26, 41; 370/546, 352; 713/200
See application file for complete search history.

(56) References Cited

U.S. PATENT DOCUMENTS

| | | | | | |
|---|---|---|---|---|---|
| 4,837,422 | A | * | 6/1989 | Dethloff et al. | 235/380 |
| 5,692,132 | A | * | 11/1997 | Hogan | 705/27 |
| 5,794,221 | A | * | 8/1998 | Egendorf | 705/40 |
| 5,815,657 | A | * | 9/1998 | Williams et al. | 713/200 |
| 5,870,759 | A | * | 2/1999 | Bauer et al. | 707/201 |
| 5,905,736 | A | * | 5/1999 | Ronen et al. | 370/546 |
| 5,914,472 | A | * | 6/1999 | Foladare et al. | 235/380 |
| 5,999,596 | A | * | 12/1999 | Walker et al. | 379/91.01 |
| 6,012,144 | A | * | 1/2000 | Pickett | 726/26 |
| 6,052,797 | A | | 4/2000 | Ofek et al. | |
| 6,327,348 | B1 | * | 12/2001 | Walker et al. | 379/91.01 |
| 6,490,567 | B1 | * | 12/2002 | Gregory | 705/39 |
| 6,604,131 | B1 | | 8/2003 | Warris et al. | |
| 6,633,878 | B1 | | 10/2003 | Underwood | |
| 6,636,863 | B1 | * | 10/2003 | Friesen | 707/102 |
| 6,671,695 | B2 | | 12/2003 | McFadden | |
| 6,694,413 | B1 | | 2/2004 | Mimatsu et al. | |
| 7,024,412 | B1 | * | 4/2006 | Webb et al. | 707/100 |
| 2001/0037250 | A1 | * | 11/2001 | Lefkowitz | 705/26 |
| 2001/0037315 | A1 | * | 11/2001 | Saliba et al. | 705/70 |

OTHER PUBLICATIONS

Sirbu, Marvin A.; "Credits and Debits on the Internet"; IEEE Spectrum; Feb. 1997; pp. 23-29.*
U.S. Appl. No. 09/986,148, filed Nov. 7, 2001.

* cited by examiner

Primary Examiner—Charles Rones
Assistant Examiner—Jacob F Betit
(74) Attorney, Agent, or Firm—Withers & Keys, LLC

(57) ABSTRACT

Embodiments of the present invention relate to systems and methods for database registration. According to an embodiment of the present invention, a method for database registration includes receiving a user identifier of a user and then sending a query to a first database based at least in part on the user identifier. A first data value associated with the user is received from the first database. A second data value associated with the user is received from a data source, which is different from the first database. The first data value and the second data value are stored in a second database, which is different from the first database.

13 Claims, 18 Drawing Sheets

FIG. 7

SYSTEMS AND METHODS FOR DATABASE REGISTRATION

BACKGROUND OF THE INVENTION

1. Field of the Invention

Embodiments of the present invention relate to information databases. More particularly, embodiments of the present invention relate to systems and methods for database registration.

2. Background Information

A database can be an integral part of an information system. For example, a database can store information regarding a person such as an identification number corresponding to the person, the person's name, contact information regarding the person (e.g., address data, telephone number, e-mail address, etc.), the person's Social Security number (which may or may not be the same as the employee identifier), the date of birth of the person, and so on. Such a database can be part of an information system of an entity such as a commercial enterprise, a financial company, a non-profit organization, a governmental entity, an individual, and so on. For example, a bank or other financial institution can store customer information in a database. As another example, a retail operation (e.g., a store, an online merchant, a mail order catalog operation, an individual proprietor, etc.) can include a database as part of an information system storing customer and/or potential customer information. As another example, a company can maintain an information system including a database that stores information about employees.

An entity having an information system including a first database may have a need to create a second database. For example, a company may have an employee database that stores information regarding the employee such as the employee name, an identifier of the employee (e.g., an employee identification number), the employee's office address, the employee's phone number, and so on. The entity can decide to implement an electronic procurement system that requires information about the employees authorized to use the electronic procurement system. The electronic procurement system can require that the employee information be stored in another database, i.e., a database storing information required by the electronic procurement system. Known methods of populating an electronic procurement system database include having an employee register as a new user and enter the required information into the database. The information entered into the electronic procurement system database may need to be validated, however, by system administrators to verify the accuracy of the employee data, rights of the employee, and so on. In view of the foregoing, it can be appreciated that a substantial need exists for systems and methods that can advantageously provide for database registration.

BRIEF SUMMARY OF THE INVENTION

Embodiments of the present invention relate to systems and methods for database registration. According to an embodiment of the present invention, a method for database registration includes receiving a user identifier of a user and then sending a query to a first database based at least in part on the user identifier. A first data value associated with the user is received from the first database. A second data value associated with the user is received from a data source, which is different from the first database. The first data value and the second data value are stored in a second database, which is different from the first database.

In another embodiment of the present invention, a method for database registration includes receiving a user identification of a user via a computer of a first information system. A query based at least in part on the user identification is sent to a first database of the first information system. A first data value associated with the user is received from the first database. A second data value associated with the user is received from the computer. The user identification, the first data value, and the second data value are stored in a second database of the first information system, where the second database is different from the first database. The second data value is validated. The validated second data value and the first data value are sent to a third database, where the third database is different from the first database and the second database. The third database is part of a second information system, and the second information system is different from the first information system.

In a further embodiment of the present invention, a system for database registration includes a first server, and the first server includes database registration instructions. A first database is coupled to the first server and stores at least in part a first data value associated with a user. A computer is coupled to the first server and receives a second data value associated with the user. The computer also receives the first data value from the first database. A second database is coupled to the computer and receives the first data value and the second data value from the computer. The second database stores the first data value and the second data value.

A system for database registration, in another embodiment of the present invention, includes a first server of a first information system. The first server includes database registration instructions and user data feed instructions. A first database of the first information system is coupled to the first server and stores at least in part a first data value associated with a user. A computer of the first information system is coupled to the first server, receives a second data value associated with the user, and receives the first data value from the first database. A second database of the first information system is coupled to the computer, receives the first data value and the second data value from the computer, and stores the first data value and the second data value. A second server is coupled to the first server. The second server is part of a second information system and includes user data upload instructions. A third database is coupled to the second server. The third database is part of the second information system.

BRIEF DESCRIPTION OF THE DRAWINGS

FIG. 7 is an illustration of a GUI in accordance with an embodiment of the present invention.

DETAILED DESCRIPTION OF THE INVENTION

According to an embodiment of the present invention, a system for database registration can retrieve information from a first database (e.g., a master database, a central database, an older database, etc.) to populate at least in part a second database (e.g., a new database, a related database, etc.). The database registration system can reduce overhead required to load users into the second database. Information about users can be retrieved from the first database and selectively loaded into the second database.

For example, in an embodiment of the present invention, a corporation can include an information system having a master database storing information about a plurality of employees. For each employee, the database can include an employee's name, identification number, electronic mail ("e-mail") address, corporate organization, telephone number, facsimile number, and so on. The information stored in the master database may have been validated to verify the accuracy of the information.

The corporation can establish a business-to-business online buying ("BOB") system to, among other things, provide for electronic procurement of goods and/or services. For example, the corporation can establish the BOB system with an electronic procurement vendor or other business partner. An example of an electronic procurement vendor is Commerce One, which is headquartered in Pleasanton, Calif. An example of an electronic procurement system operated at least in part by Commerce One includes a server and database to receive and process customer user information and electronic procurement orders.

When the corporation establishes and maintains a BOB system with the electronic procurement vendor, the database of the electronic procurement vendor can store information about employees of the corporation as part of operating the BOB system. For example, when the BOB system is first established, user accounts for employees of the corporation may need to be established. The user account information can be stored in the electronic procurement vendor database. Certain employee information for each user account need not be entered by the user/employee, but instead can be pulled from the corporation's database that already stores information regarding the user/employee. Accordingly, the corporation and employee utilize less employee resources (e.g., time, focus, etc.) to establish the electronic procurement system. Moreover, the data stored in the electronic procurement system is typically more accurate and requires less need for error checking and data validation.

Figure 1:
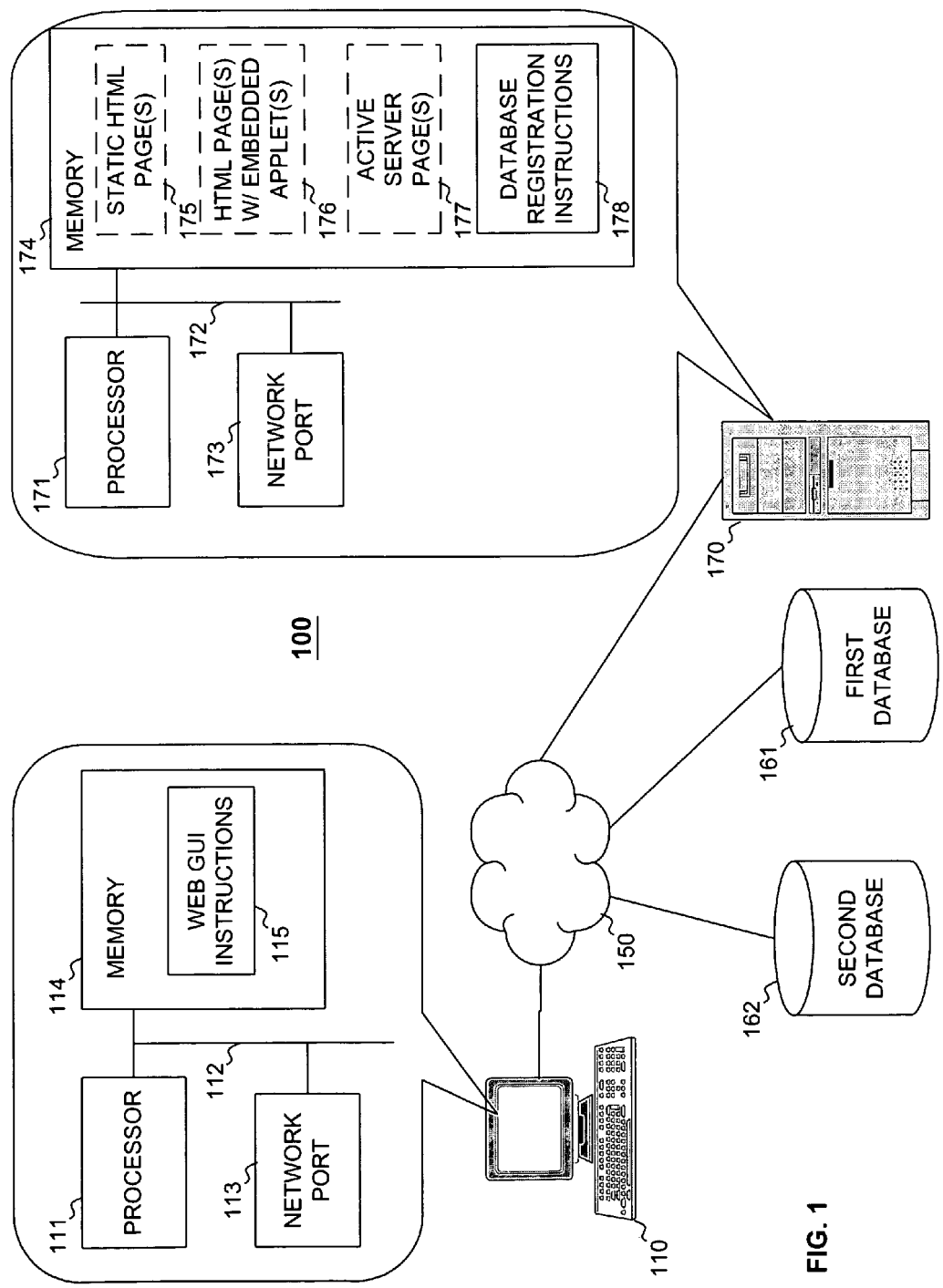
FIG. 1 is a schematic diagram of an embodiment of the present invention.

FIG. 1 is a schematic diagram of an embodiment of the present invention. In an embodiment, an information system 100 can allow a user to access a first database 161 and/or a second database 162 via a computer 110 and a network 150. Computer 110 can include a processor 111, and processor 111 can be coupled to a network port 113 and a memory 114 via a bus 112. As used to describe embodiments of the present invention, the term "coupled" encompasses a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on. Examples of network 150 include a Wide Area Network (WAN), a Local Area Network (LAN), the Internet, a wireless network, a wired network, a connection-oriented network, a packet network, an Internet Protocol (IP) network, or a combination thereof.

Processor 111 can be, for example, an Intel Pentium® IV processor, manufactured by Intel Corp. of Santa Clara, Calif. As another example, processor 111 can be an Application Specific Integrated Circuit (ASIC). Memory 114 may be a random access memory (RAM), a dynamic RAM (DRAM), a static RAM (SRAM), a volatile memory, a non-volatile memory, a flash RAM, polymer ferroelectric RAM, Ovonics Unified Memory, magnetic RAM, a cache memory, a hard disk drive, a magnetic storage device, an optical storage device, a magneto-optical storage device, or a combination thereof. Memory 114 can store a plurality of instructions configured to be executed by processor 111.

For example, memory 114 can store client-side web graphical user interface ("GUI") instructions (e.g., a web browser) that can manage at least in part communications between computer 110 and server 170. Examples of client-side web graphical user interface instructions include Internet Explorer 5.0 (or a later version) from Microsoft Corporation of Redmond, Wash. and Netscape Navigator 4.72 (or a later version) from Netscape Communications of Mountain View, Calif. Server 170 can be a web server that sends documents and files (e.g., audio, video, graphics, text, etc.) to computer 110 in response to requests from computer 110 and web GUI instructions 115.

Server 170 can send information to computer 110 that is stored on server 170, first database 161, second database 162, or other data storage devices. For example, server 170 can include a processor 171 coupled to a memory 174 and a network port 173 via a bus 172. In an embodiment, memory 174 can include one or more of static hypertext markup language ("HTML") page(s) 175, HTML page(s) with embedded applet(s) 176, and Active Server Page(s) 177. For example, computer 110 and web GUI instructions 115 can request that information corresponding to a network address (e.g., www.networkaddress.com) associated with server 170 be sent to computer 110. The server 170 can receive the request and send data (e.g., a static HTML page, an HTP page with an embedded applet, an Active Server Page, etc.) to the computer 110.

In an embodiment, information system 100 can be a client-side (e.g., corporation side, etc.) of an electronic procurement system operated by, or at the direction of, a corporation and an electronic procurement vendor. First database 161 can be a corporation database that stores information about employees and/or entities of the corporation. Users of the electronic procurement system can be users including corporate employees, corporate entities, and so on. Examples of corporate entities include corporate divisions, subsidiaries, organizational units, and so on. Second database 162 can be a database that stores information about users of the electronic procurement system. For example, second database 162 can include a plurality of user records, where each user record of at least a subset of the plurality of user records corresponds to a user. According to an embodiment of the present invention, user records stored on second database 162 can be populated with information entered by a user (e.g., via computer 110) or retrieved from first database 161.

For example, in an embodiment of the present invention, server 170 includes database registration instructions 178 to be executed by processor 171. When a user accesses server 170 via computer 110 to register as a user of the electronic procurement system, the database registration instructions 178 can direct registration of the user. For example, in an embodiment, the database registration instructions 178 can determine what type of web browser (e.g., Internet Explorer, Netscape Navigator, etc.) on computer 110 is being used to access server 170 and then send the appropriate web page information (e.g., an HTML page with an Internet Explorer-compatible applet, an HTML page with a Netscape Navigator-compatible applet, an Active Server Page, etc.) to computer 110. The database registration instructions 178, in an embodiment, can include one or more applets that are sent to computer 110 as part of a web page. In an embodiment, the database registration instructions 178 can only be accessed by a computer via an intranet or other secure and/or trusted connection.

At least a portion of the database registration instructions 178 can request that a user at computer 110 enter an identifier, such as an employee identifier (e.g., an employee identification number, an employee user name, an employee identification code, or other employee identification data), an entity identifier, and so on. The database registration instructions 178 can use the identifier to retrieve user information from the first database 161 (e.g., name, e-mail address, business telephone number, business address, etc.) and display at least a portion of that retrieved user information to the user at computer 110. The user can be prompted to enter additional information, such as additional information related to the electronic procurement system, by the database registration instructions 178. Then the retrieved information from the first database 161 and the additional information input by the user can be stored in the second database 162.

Figure 2:
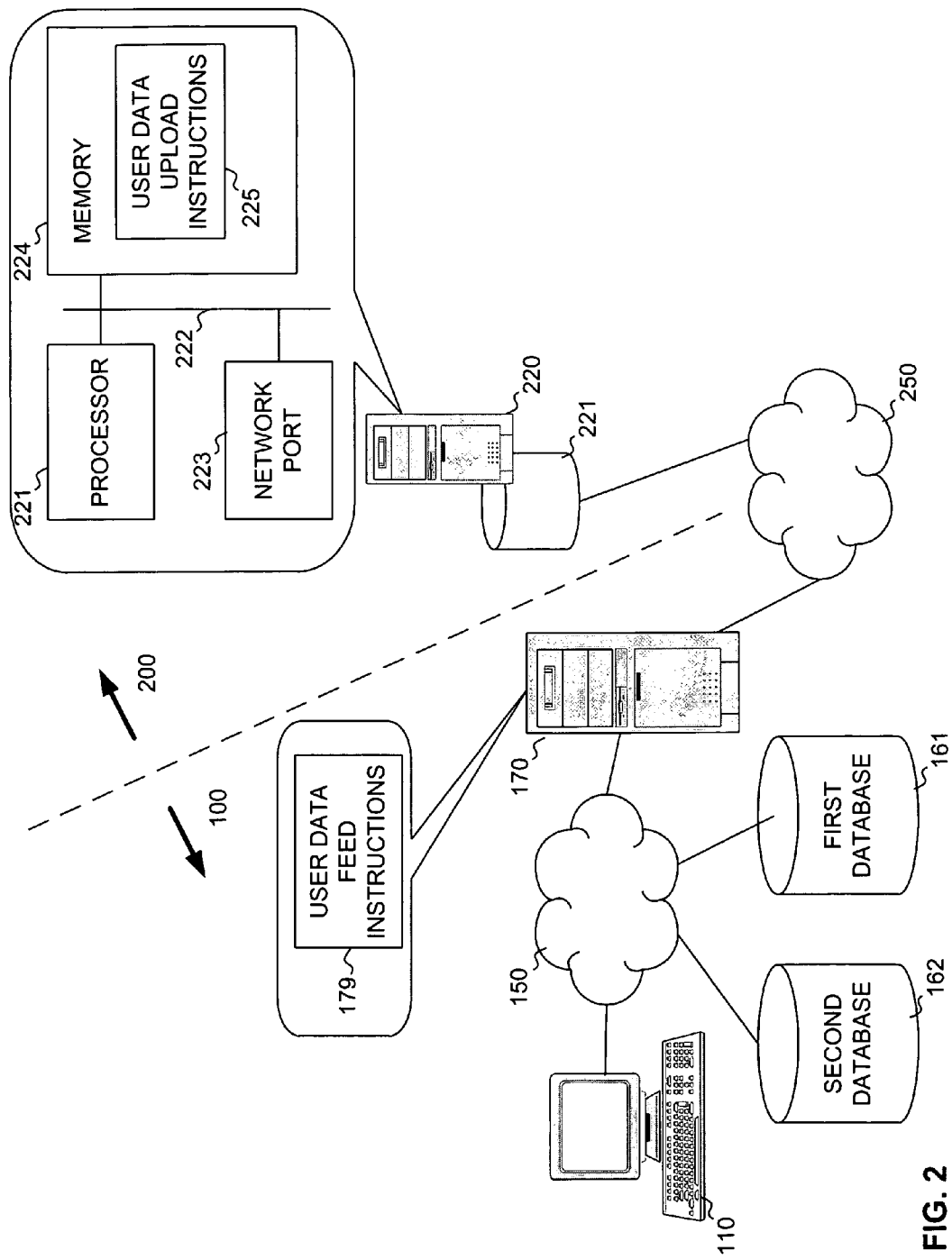
FIG. 2 is a schematic diagram of another embodiment of the present invention.

FIG. 2 is a schematic diagram of another embodiment of the present invention. Information system 100 can be coupled to an electronic procurement vendor system 200 via a network 250. In an embodiment, network 150 and network 250 can be the same network, different networks, different subsets of a common network, and so on. The electronic procurement vendor system 200 can include a vendor server 220 and a vendor database 221. The vendor server 220 can include a processor 221 coupled to a memory 224 and a network port 223 via a bus 222. The memory 224 can include user data upload instructions 225 to receive user data from the information system 100 and store the user data in vendor database 221. Server 170 can include user data feed instructions 179 to retrieve user data from second database 162 and send at least a portion (e.g., a preselected portion) of the user data to electronic procurement vendor system 200. User data upload instructions 225 can receive the at least a portion of the user data and create electronic purchasing accounts based at least in part on the received user data.

According to an embodiment of the present invention, information system 100 and electronic procurement vendor system 200 are part of a BOB system, and the BOB system includes a database registration system. For example, the database registration system can load users in the BOB system. The database registration system can reduce the overhead required to load users into the BOB system and/or the electronic procurement vendor system 200 by querying for, receiving, and storing in an application database (e.g., second database 162) user data previously stored in a master database of information system 100 (e.g., first database 161). Additional user data can be queried for and received from the user and stored in the application database. Then, user data can be retrieved from the application database and loaded into the electronic procurement vendor system 200. For example, in an embodiment of the present invention, mass user loads can be performed by sending user data from the application database of information system 100 to the electronic procurement vendor system 200 on a period basis to establish new user accounts. In another embodiment of the invention, the data stored in the application database can be validated and/or checked for accuracy prior to being sent to the electronic procurement vendor system 200.

In an embodiment of the present invention, the database registration system can include a self-registration tool that allows a user to register as a user of the BOB system. For example, the self-registration tool can include a web-base GUI that acts as a front-end of the self-registration tool and collects information from a user to establish a user account. The self-registration tool can also include a plurality of back-end components. For example, a first back-end component can be an application database that stores user information to establish a user account. A second back-end component can be a system that sends user information from the application database to an electronic procurement vendor system, where user accounts can be created based on the received user information.

FIGS. 3 through 14 show illustrations of GUIs of a self-registration tool in accordance with an embodiment of the present invention. The GUIs can be HTML web pages that are received by a computer of a user, and one or more of the HTML web pages can include applets that query for and receive data from a user, query for and receive data from a master database (e.g., a first database), and send the received data to an application database (e.g., a second database). The self-registration tool can query and receive data from the master database to retrieve pre-validated information so as to reduce the volume of inaccurate data entered by the user. In an embodiment, the applets can query and receive data from the application database. For example, the data received from the second database can pre-populate fields and pull-down lists of the GUIs of the self-registration tool. In another embodiment of the present invention, access to the GUIs of the self-registration tool can be restricted to users on an intranet.

Figure 3:
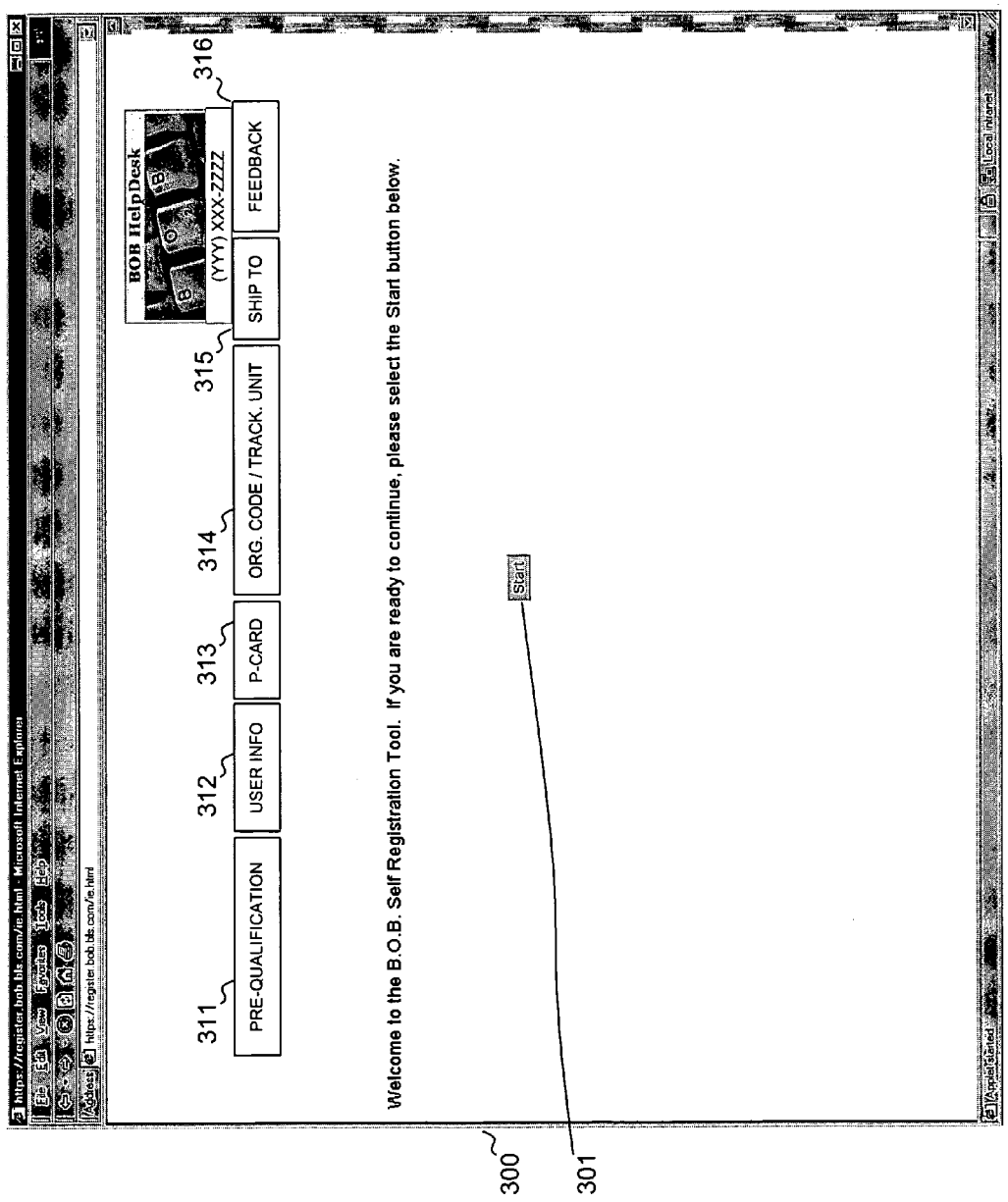
FIG. 3 is an illustration of a GUI in accordance with an embodiment of the present invention.

FIG. 3 is an illustration of a GUI in accordance with an embodiment of the present invention. Welcome panel GUI 300 can be part of a front-end of an embodiment of a self-registration tool. In an embodiment, the majority of the front-end of the self-registration tool is a Java applet embedded in an HTML page. The Java applet can be a signed and trusted applet. The different screens of the applet are referred to as panels herein. The self-registration tool also can include two Active Server Pages, which are referred to as pages. GUI 300 can be a panel that requests that the user provide action to the applet. For example, GUI 300 includes a Start button 301 that the user can select and activate (e.g., using a mouse, using a trackball, using another GUI pointing device, etc.). When the user provides action to the applet (e.g., selects and activates the Start button 301 of GUI 300), the applet can make a connection to the master database to retrieve information that will pre-populate fields and/or pull-down lists of subsequent panels and/or pages. In another embodiment, the applet can make a connection to the application database to retrieve information that will pre-populate fields and/or pull-down lists of subsequent panels and/or pages. In a further embodiment, the applet can make a connection to each of the master database and the application database to retrieve information to pre-populate fields and/or pull-down lists of subsequent panels and/or pages.

Welcome panel GUI 300 can also include a plurality of panel indicators 311-316 to illustrate the progress of the user through a succession of panels of the front-end of the self-registration tool. For example, the plurality of panel indicators can include a pre-qualification panel indicator 311, a user-info panel indicator 312, a purchasing card ("p-card") panel indicator 313, an organization code/tracking unit panel indicator 314, a ship to panel indicator 315, and a feedback panel indicator 316. When a panel is displayed on a computer (e.g., a computer display, a computer screen, etc.), a corresponding panel indicator can be highlighted, emphasized, or colored to indicate which panel is displayed. Alternatively, the coloring, highlighting, or emphasis of a panel indicator can be changed after the corresponding panel has been displayed. For example, panel indicators of panels not yet viewed can be a first color (such as green), and panel indicators of panels already viewed can be a second color (such as red).

Figure 4:
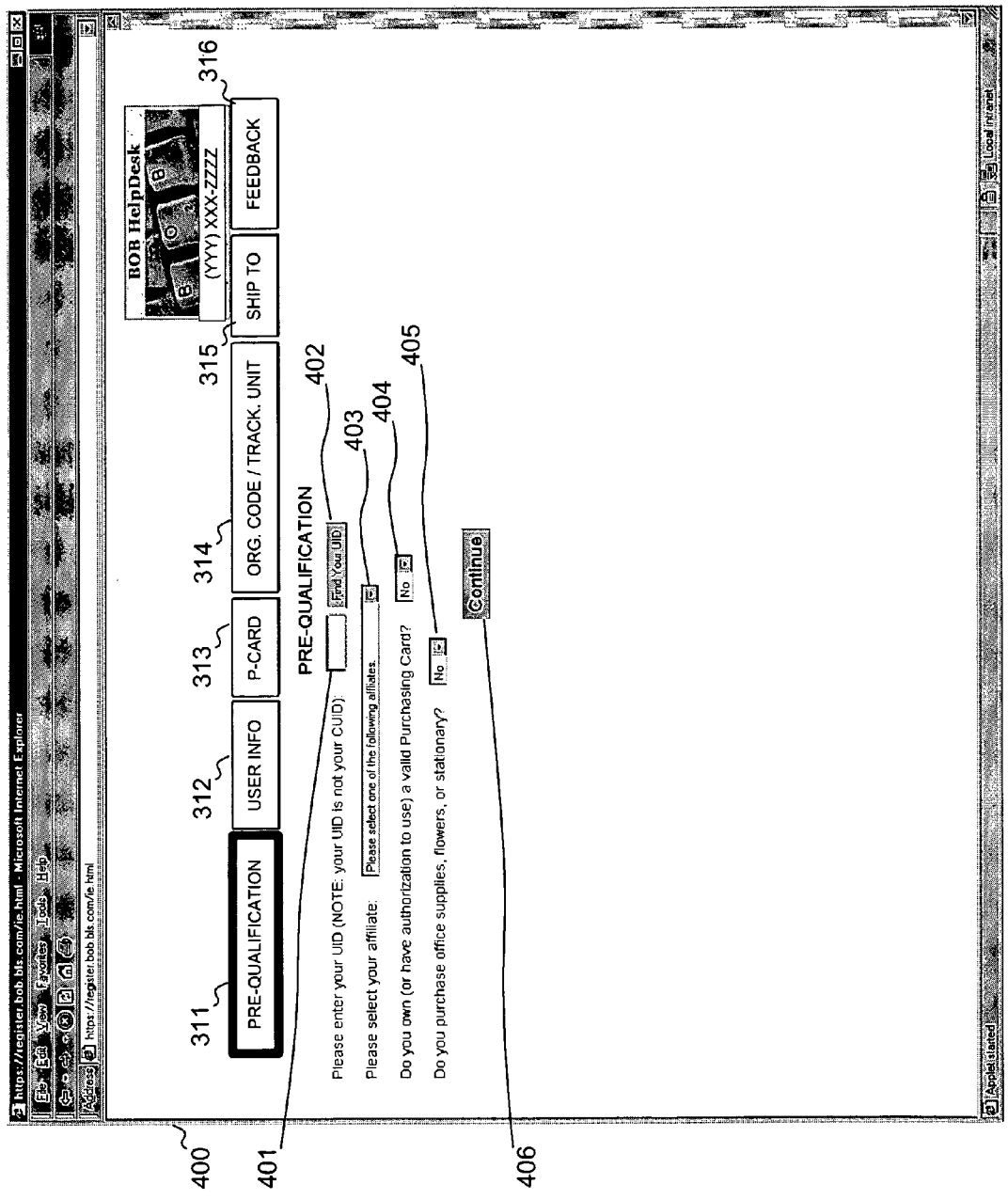
FIG. 4 is an illustration of a GUI in accordance with an embodiment of the present invention.

FIG. 4 is an illustration of a GUI in accordance with an embodiment of the present invention. Pre-Qualification panel GUI 400 can prompt a user to enter information related to a pre-qualification process of the self registration tool. In an embodiment, Pre-Qualification panel GUI 400 includes a user identification ("UID") field 401 to receive and display a UID entered by the user. If the user has forgotten his or her UID, the user can select and activate the Find Your UID button 402. The applet can then query for and receive a list of UIDs and associated information (e.g., information identifying the who and/or what is associated with each UID). The user can browse the list of UIDs and associated information and select his or her UID.

Pre-Qualification panel GUI 400 can also include an affiliate drop-down list 403 (e.g., a pull-down list) that includes a list of affiliates of the entity associated with the users of the BOB system. For example, the list of affiliates can be a list of corporate entities of a corporation, a list of corporations of a parent company, a combination thereof, and so on. The affiliates drop-down list 403 can be pre-populated by the applet when the page is displayed to the user. For example, when the Pre-Qualification panel GUI 400 is requested (e.g., after the user selects and activates the Start button 301 of GUI 300), the applet can query for and receive the affiliate information from the master database and/or the application database. The user can select the proper affiliate from the affiliates drop-down list 403. In an embodiment, the pre-qualification process of the self-registration tool can screen out employees of affiliates that are not able to utilize the BOB system. For example, affiliates that are not able to utilize the BOB system are not included in the affiliates drop-down list 403.

The user can also indicate whether he owns or has authorization to use a valid purchasing card (e.g., a credit card, a debit card, etc.) via purchasing card pull-down indicator 404. For example, the user can select "yes" or "no" via purchasing card pull-down indicator 404. Pre-qualification panel GUI 400 can also include a purchasing scope drop-down list 405, which can allow a user to select "yes" or "no" as to whether she purchases office supplies, flowers, or stationary. The pre-qualification panel indicator 311 of GUI 400 is emphasized (e.g., bordered with a bolded line) to indicate that the panel currently being displayed is the pre-qualification panel. After the user has entered and/or indicated the requested information (e.g., via data entry, via selecting an entry from a drop-down list, etc.), the user can select and activate Continue button 406 to submit the requested information to the applet. In an embodiment, the applet can store the submitted information (e.g., in memory, in a storage cache, in a memory buffer, in a database, etc.).

Figure 5:
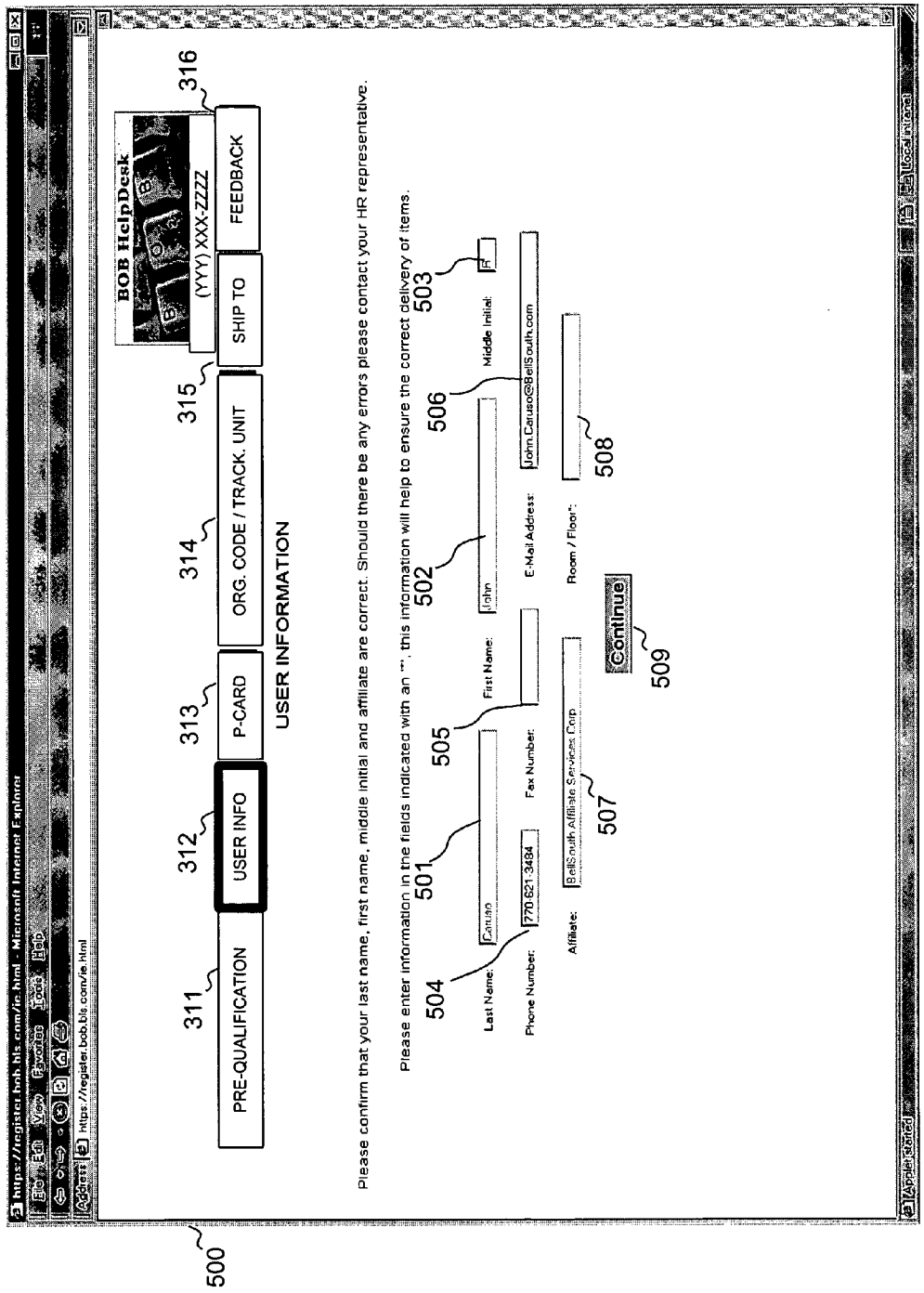
FIG. 5 is an illustration of a GUI in accordance with an embodiment of the present invention.

FIG. 5 is an illustration of a GUI in accordance with an embodiment of the present invention. After User Information panel GUI 500 is requested (e.g., after the user selects and activates the Continue button 406 of GUI 400), the applet can query for and receive certain user information from the master database and/or the application database based on information submitted via GUI 400. For example, the applet can query for and receive information from the master database and/or the application database based at least in part on the UID entered into the UID field 401 of GUI 400. When User Information panel GUI 500 is displayed, information received by the applet can be pre-populated in fields of GUI 500. For example, GUI 500 is pre-populated with information in last name field 501, first name field 502, middle initial field 503, phone number field 504, and e-mail address field 506.

Affiliate field 507 can be pre-populated with information selected by the user via affiliate drop-down list 403 of GUI 400. In an embodiment, the applet can receive the user's selection of an affiliate identifier from the affiliate drop-down list 403 and the user's entry of a UID via the UID field 401 and query the master database to confirm that the selected affiliate identifier is valid based in part on the entered UID. If there is a conflict between the selected affiliate identifier and the entered user UID, an error message can be displayed to the user.

In an embodiment of the present invention, certain information pre-populated in GUI fields can be modified and certain information pre-populated in other GUI fields cannot be modified. For example, in User Information panel GUI 500, the pre-populated information in last name field 501, first name field 502, middle initial field 503, and affiliate field 507 cannot be modified. The pre-populated information in phone number field 504 and e-mail address field 506 can be modified by the user (e.g., to correct incorrect information, to update outdated information, etc.).

The User Information panel GUI 500 can also include fields for data entry by the user. For example, GUI 500 includes a fax number field 505 and a room/floor field 508 for data entry by the user. In an embodiment of the present invention, the user is required to enter information into certain fields of the User Information panel GUI 500 and is not required (e.g., is optionally allowed) to enter information into other fields of GUI 500. After the user has entered, verified, and/or indicated the requested information, the user can select and activate Continue button 509 to submit the requested information to the applet. In an embodiment, the applet can store the submitted information (e.g., in memory, in a storage cache, in a memory buffer, in a database, etc.).

Figure 6:
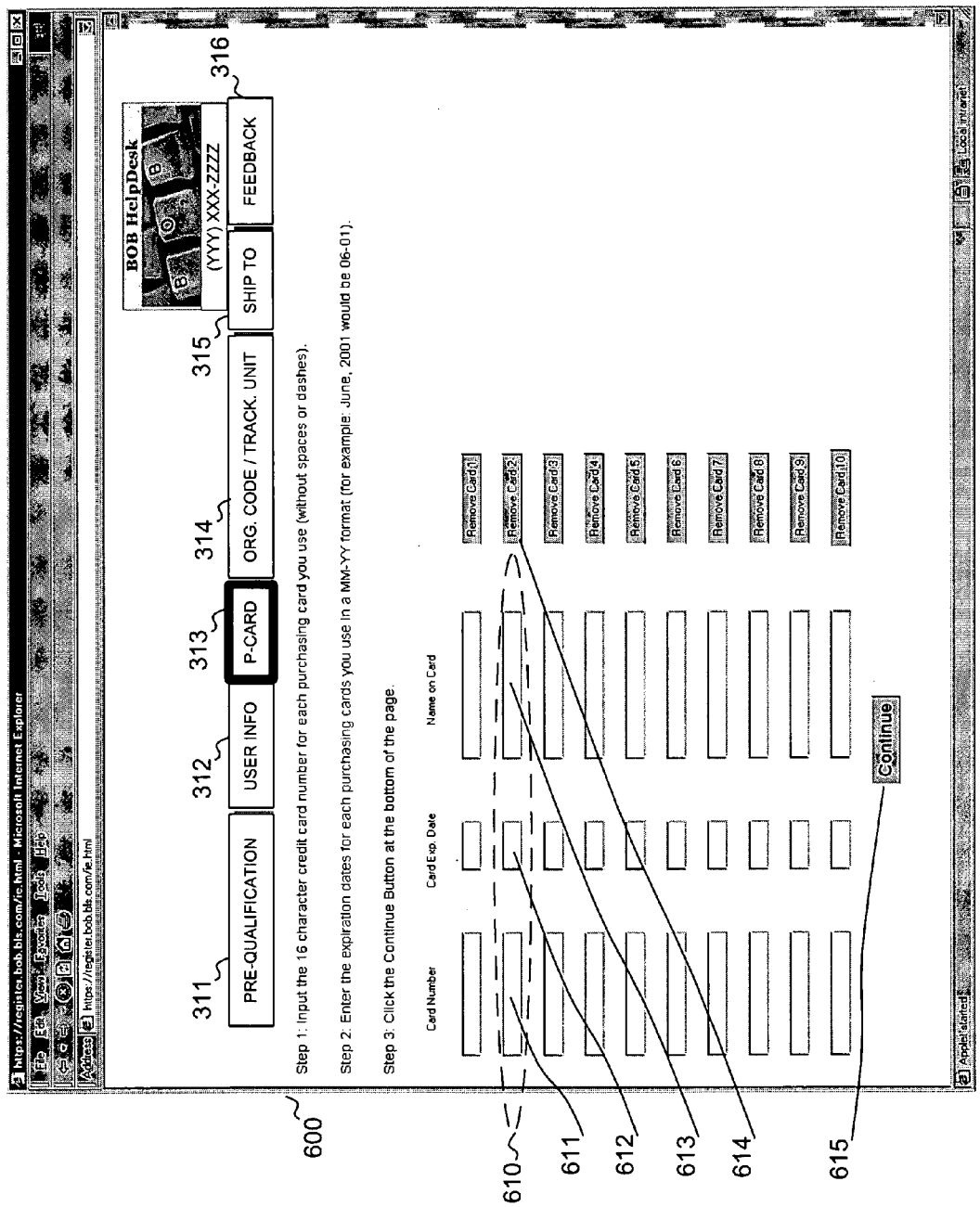
FIG. 6 is an illustration of a GUI in accordance with an embodiment of the present invention.

FIG. 6 is an illustration of a GUI in accordance with an embodiment of the present invention. After the user selects and activates the Continue button 509 of User Information panel GUI 500, the applet can determine whether the user indicated via purchasing card drop-down list 404 of GUI 400 that she owns or has authority to use a valid purchasing card. In an embodiment, when the user indicated that she owns or has authority to use a valid purchasing card, the applet can determine whether any validated purchasing card information is stored on the master database and/or the application database and pre-populate any such purchasing card information (e.g., validated purchasing card information, non-validated purchasing card information, etc.) in the Purchasing Card panel GUI 600. For example, the master database may store purchasing card information for employees and/or entities. In another example, the self registration tool of the BOB system can be used by an existing user to update her user information, which can be stored on the application database. The purchasing card information can be displayed in one or more of the purchasing card entries 610, which can include a card number field 611, a card expiration date field 612, and a name on card field 613. The user can then verify whether such information is correct, and if so, select and activate Continue button 615. When such information is not correct (e.g., the credit card has expired, the user no longer has authority to user the purchasing card, etc.), the user can select and activate a remove card button 614 to remove the pre-populated information from the corresponding purchasing card entry 610.

In another embodiment of the present invention, when the user indicated that she owns or has authority to use a valid purchasing card, the Purchasing Card panel GUI 600 is displayed without any pre-populated purchasing card information. The user can enter the purchasing card information and select and activate the Continue button 615 to submit the requested information to the applet. In an embodiment, the applet can store the submitted information (e.g., in memory, in a storage cache, in a memory buffer, in a database, etc.).

In a further embodiment of the present invention, when the user indicates that he does not own or have authority to use a valid purchasing card, the self registration tool can prompt the user to enter whether purchases are to be billed to a general ledger (e.g., a corporate general ledger, an affiliate's general ledger, an employee's general ledger, an entity's general ledger, etc.). For example, certain supply or product categories (e.g., software) can be billed to a general ledger. If the user indicates that she does not own or have authority to use a purchasing card and that purchases are not to be billed to the general ledger, the self registration tool can prompt the user to enter a personal charge card number (e.g., a credit card, a debit card, an electronic funds transfer card, etc.) or inform the user that she cannot use the BOB system without indicating how BOB system purchases are to be billed.

According to an embodiment of the present invention, after the user selects and activates the Continue button 615 of the Purchasing Card panel GUI 600, the applet can validate the purchasing card information entered by the user against a source database of validated purchasing cards. In an embodiment, the validated purchasing card source database can be a portion of the master database, a portion of the application database, or database discrete from the master database and the application database. For example, in an embodiment, two criteria are to be met before purchasing card information is accepted as valid: (i) an identical name on card and credit card number pair is found in the validated purchasing card source database; and (ii) a valid expiration date (e.g., correct MM-YY format, date between present date and ten years from present date, etc.) is provided. When a matching record is not found in the validated purchasing card source database, then the user can be prompted to verify that the name and card number is correct. If the user indicates that such information was correct, the purchasing card information entry can be flagged to be manually validated (e.g., by BOB system administrative personnel, by validated purchasing card source database personnel, by corporation personnel, by affiliate personnel, etc.).

Figure 7:
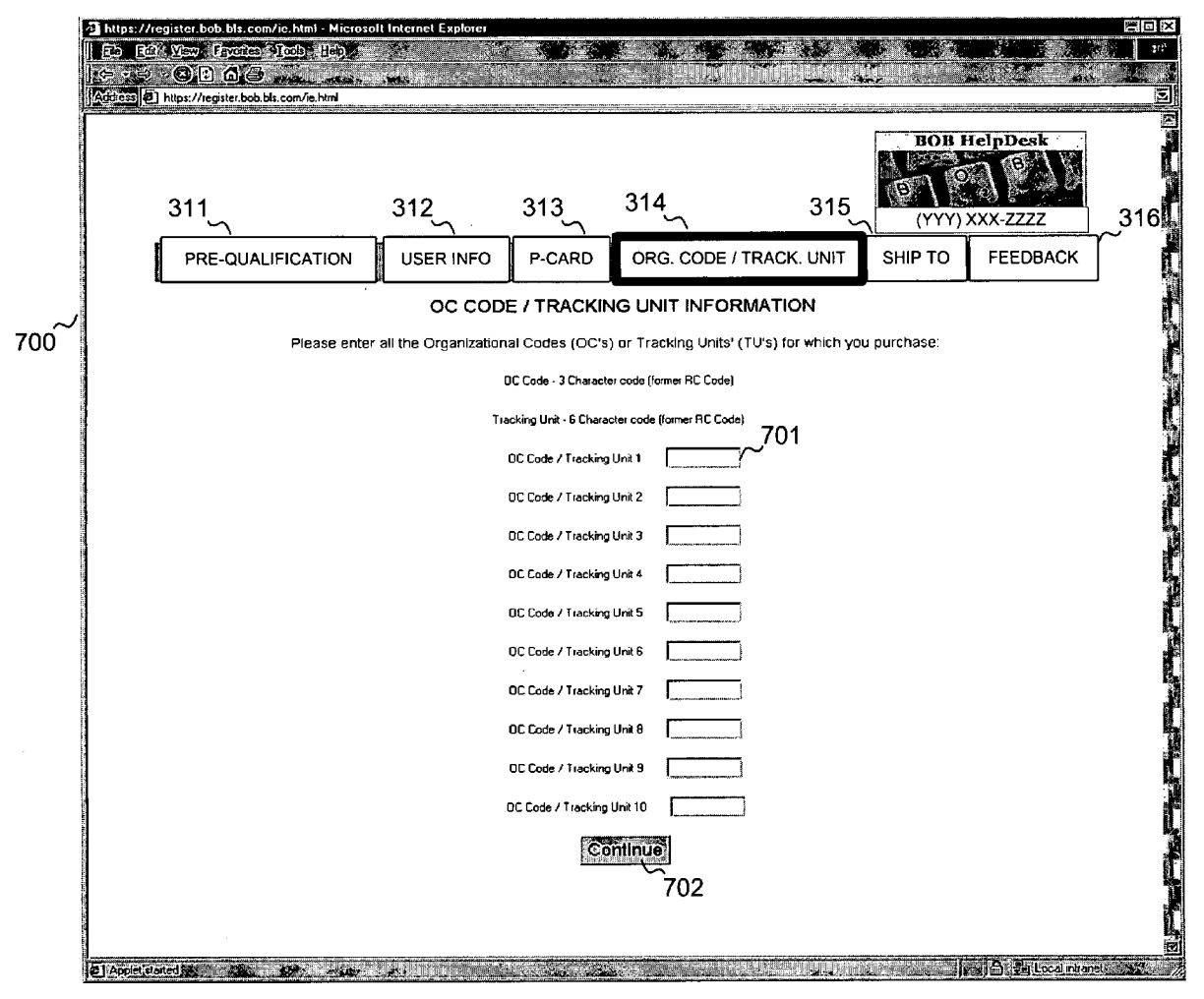

FIG. 7 is an illustration of a GUI in accordance with an embodiment of the present invention. After the user selects and activates the Continue button 615 of Purchasing Card panel GUI 600, the user can enter one or more organizational codes and/or tracking unit identifiers in fields 701 of Organization Code/Tracking Unit panel GUI 700 for purchases made by the user. Organizational codes and/or tracking unit identifiers can be used for accounting purposes related to purchases made via the BOB system. In an embodiment, at least one organization code and/or tracking unit identifier has to be entered. After the user has entered one or more organizational codes and/or tracking unit identifiers, if any, the user can select and activate the Continue button 702 to submit the requested information to the applet. In an embodiment, the applet can store the submitted information (e.g., in memory, in a storage cache, in a memory buffer, in a database, etc.).

Figure 8:
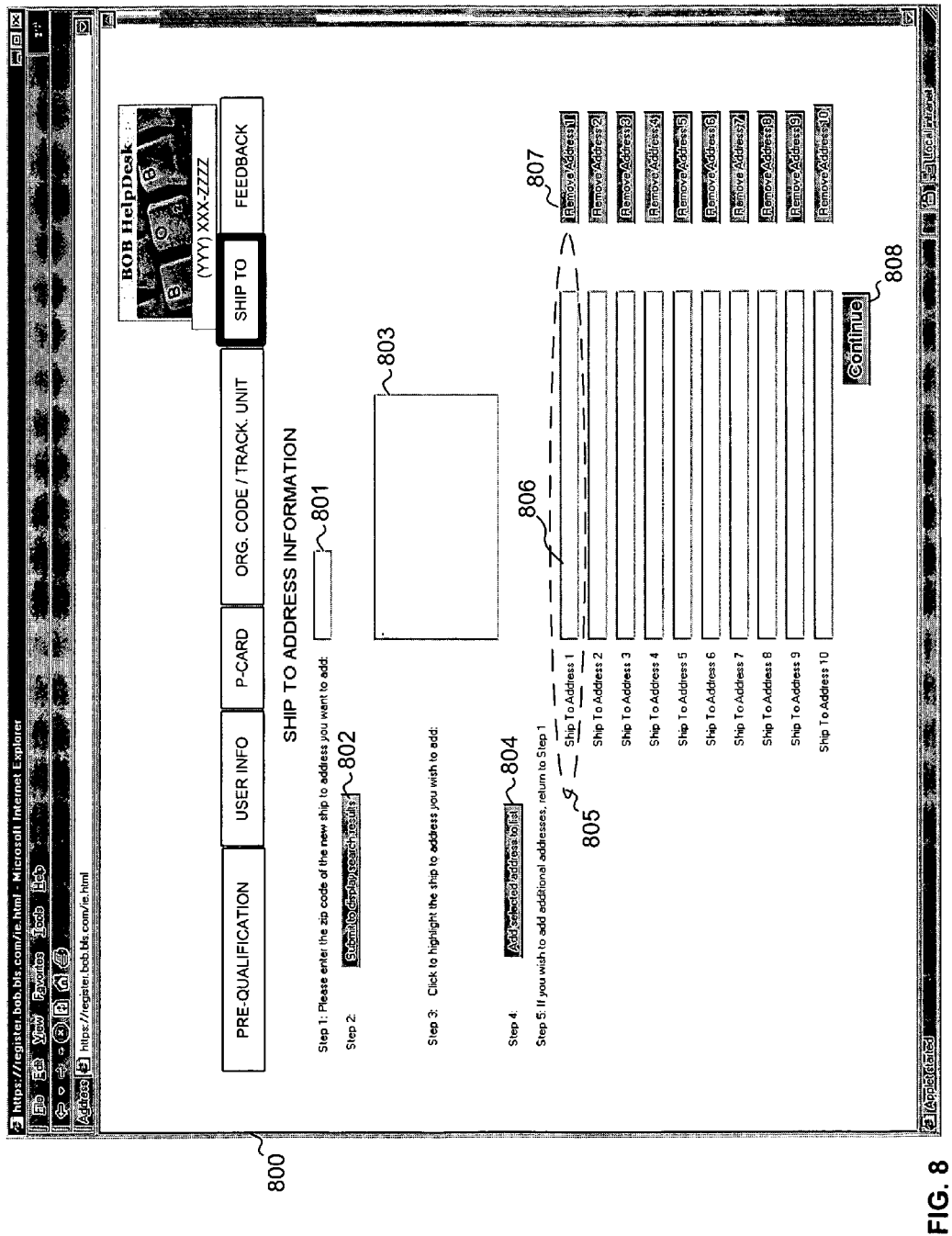
FIG. 8 is an illustration of a GUI in accordance with an embodiment of the present invention.

FIG. 8 is an illustration of a GUI in accordance with an embodiment of the present invention. After the user selects and activates the Continue button 702 of Organizational Code/Tracking Unit panel GUI 700, the user can enter, indicate, and/or verify shipping address information via the Ship To Address Information panel GUI 800. In an embodiment, the applet can determine whether any validated shipping information for the user is stored on the master database and/or the application database and pre-populate any such shipping information (e.g., validated shipping information, non-validated shipping information, etc.) in the Ship To Address Information panel GUI 800. For example, the master database may store shipping information for employees and/or entities. In another example, the self-registration tool of the BOB system can be used by an existing user to update his user information including shipping information, which can be stored on the application database. The shipping information can be displayed in one or more of the shipping information entries 805, which can include a ship to address field 806. The user can then verify whether such information is correct, and if so, select and activate Continue button 808. When such information is not correct (e.g., the shipping address is no longer valid, the user has changed business locations, etc.), the user can select and activate a remove shipping address button 807 to remove the pre-populated shipping information from the corresponding shipping information entry 805.

In another embodiment of the present invention, the Ship To Address Information panel GUI 800 is displayed without any pre-populated shipping information. For example, the user of the self-registration tool may be a new user. In an embodiment of the present invention, the user cannot enter any shipping address but can select a shipping address from one or more validated shipping addresses. For example, the BOB system may not allow users to enter shipping addresses to prevent users from shipping BOB system purchases to home addresses or other addresses to reduce the potential for fraud and abuse.

To select shipping address information from the set of validated shipping address information, the user can enter a zip code (e.g., a business zip code, a home zip code, etc.) via zip code shipping field 801. The user can then select and activate Submit button 802. The applet can receive the zip code, formulate and send a query based at least in part on the zip code, and receive validated shipping address information based at least in part on the zip code. The applet can then populate the selectable shipping address information window 803 with shipping addresses that can be selected by the user. The user can click to highlight the shipping address information in window 803 that they wish to add as a shipping information entry 805, and then select and activate the add selected address to list button 804. The applet will then populate a shipping information entry 805, which includes a ship to address field 806, based on the shipping address information highlighted by the user. In an embodiment, the user can add another shipping address as a shipping information entry 805 by entering a zip code in zip code field 801. The user can remove a shipping information entry 805 by selecting and activating Remove Address button 807. After the user has selected one or more shipping addresses, the user can select and activate the Continue button 808 to submit the requested information to the applet. In an embodiment, the applet can store the submitted information (e.g., in memory, in a storage cache, in a memory buffer, in a database, etc.).

Figure 9:
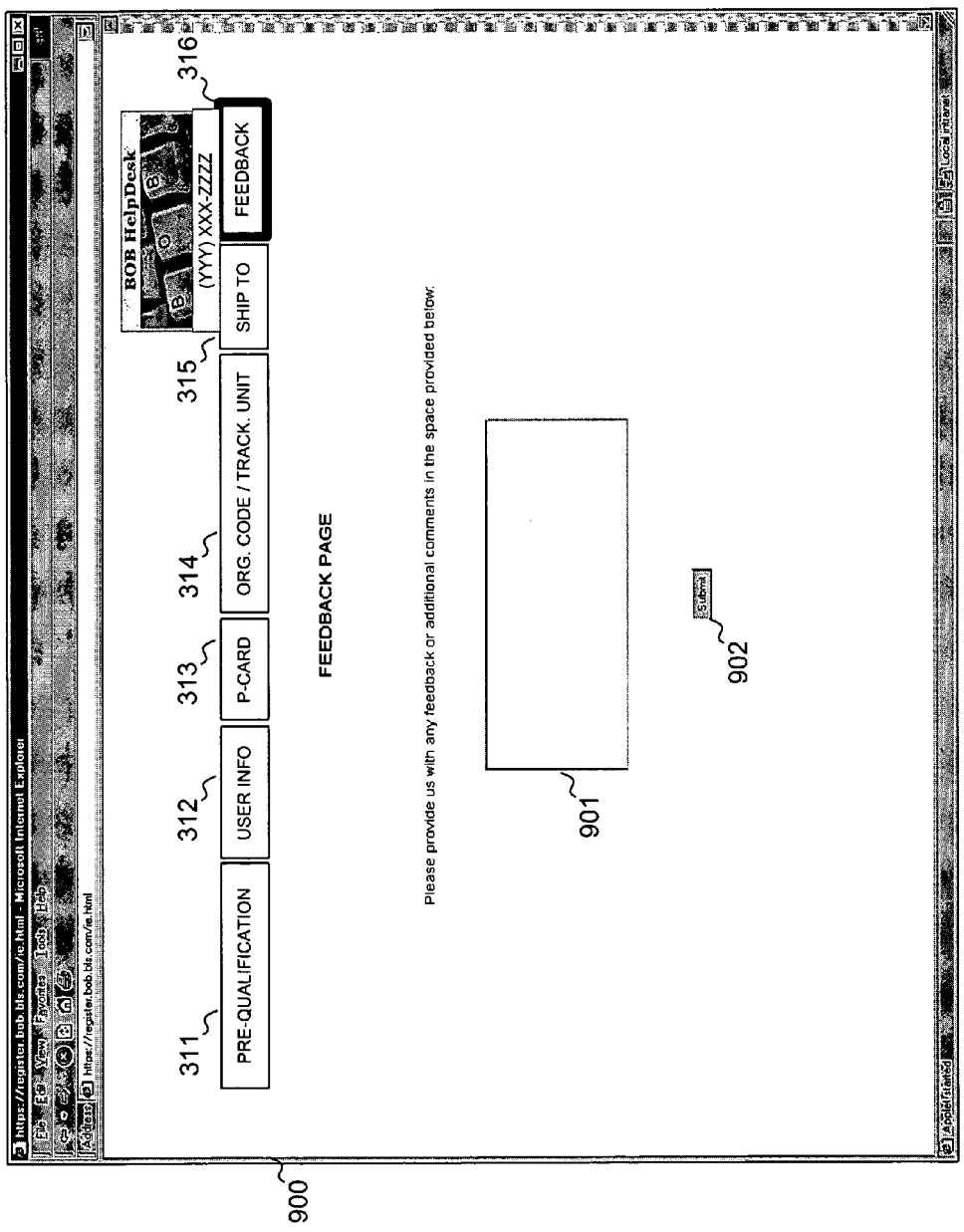
FIG. 9 is an illustration of a GUI in accordance with an embodiment of the present invention.

FIG. 9 is an illustration of a GUI in accordance with an embodiment of the present invention. After the user selects and activates the Continue button 808 of the Ship to Address Information panel GUI 800, the user can enter any feedback or additional comments via the Feedback Page panel GUI 800. For example, GUI 800 includes a feedback entry window 901 into which a user can type feedback, comments, or questions. After the user has entered any feedback, the user can select and activate the Submit button 902 to submit the information to the applet. In an embodiment, the applet can store the submitted information (e.g., in memory, in a storage cache, in a memory buffer, in a database, etc.).

Figure 10:
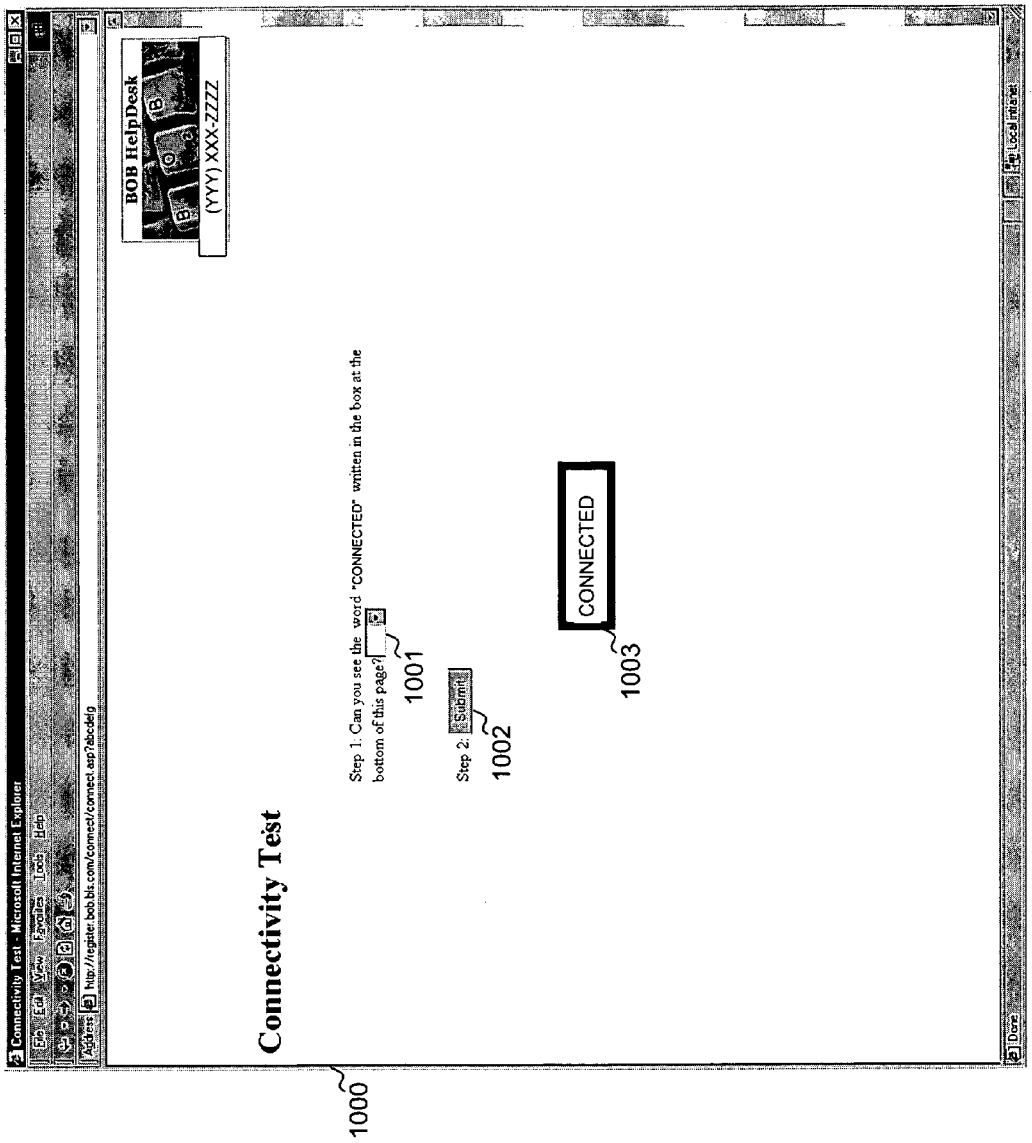
FIG. 10 is an illustration of a GUI in accordance with an embodiment of the present invention.

FIG. 10 is an illustration of a GUI in accordance with an embodiment of the present invention. After the user selects and activates the Submit button 902 of the Feedback Page panel GUI 900, the applet can cause Connectivity Test panel GUI 11000 to be displayed to the user. The Connectivity Test panel GUI 1000 can include a connected indicator field 1003 that can indicate whether the applet has been able to establish a connection to the application database. In an embodiment, the applet locally stores (e.g., in memory, in storage, etc.) the information received during operation of the self-registration tool (e.g., the purchasing card information, the shipping information, etc.) but is to write that information to the application database. Connectivity Test panel GUI 1000 can allow the applet to indicate whether it is able to connect to the application database. When the applet is able to connect to the application database, it can display a connected indicator (e.g., "CONNECTED") in the connected indicator field 1003. When the applet is unable to connect to the application database, the connected indicator field 1003 can be blank or display "unconnected". The user can indicate whether or not he can see the connected indicator in the connected indicator field 1003 via drop-down list 1001, which can include list items "yes" and "no," and selecting and activating the submit button 1002. When the applet receives a "yes" indication from the user via drop-down list 1001, the applet can send its information to the application database. When the applet receives a "no" indication from the user via drop-down list 1001, the applet can try to establish and alternative connection to the application database, temporarily store the information (e.g., in storage, in a database, etc.), or display an error message.

Figure 11:
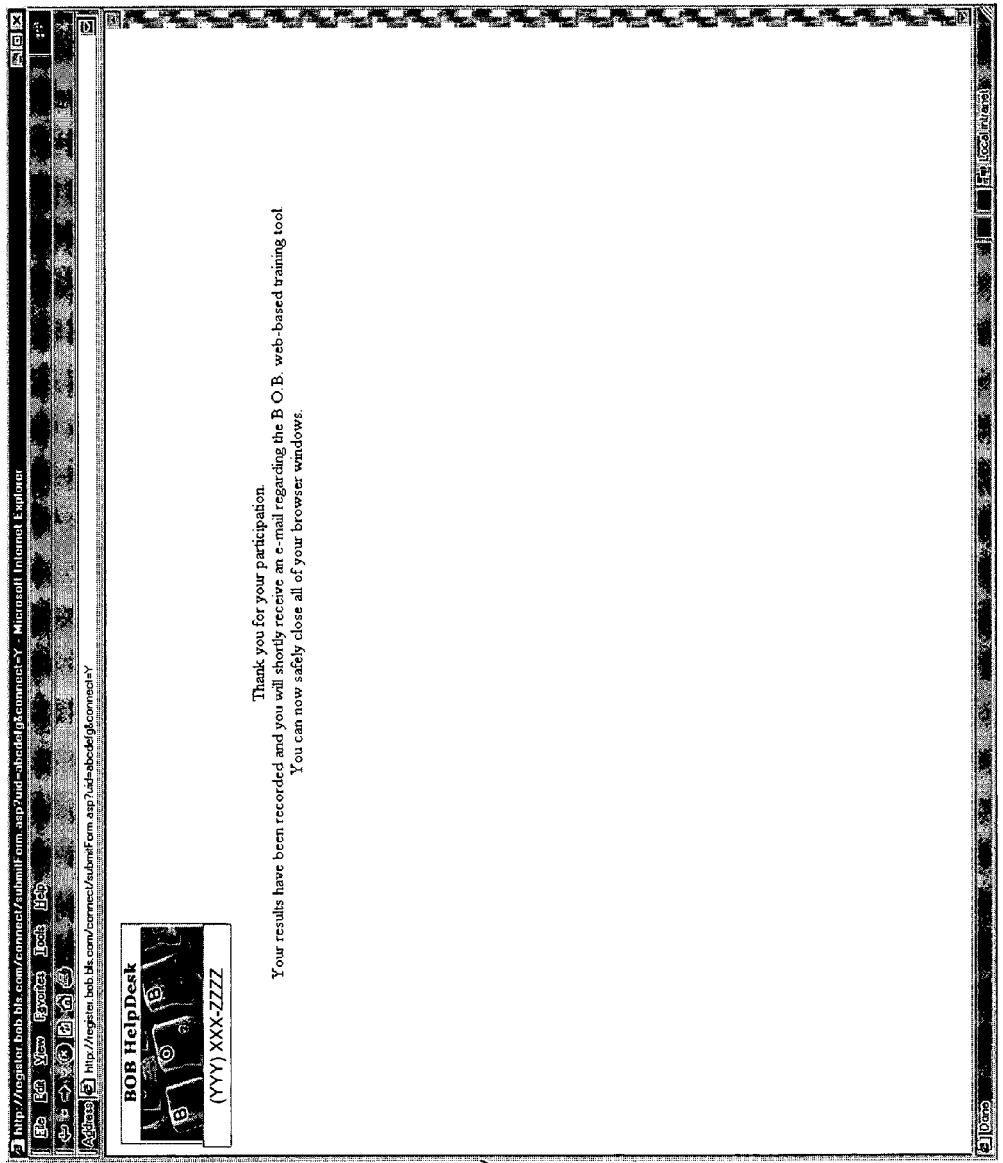
FIG. 11 is an illustration of a GUI in accordance with an embodiment of the present invention.

FIG. 11 is an illustration of a GUI in accordance with an embodiment of the present invention. After the user selects and activates the Submit button 1002 of the Connectivity Test panel GUI 1000, the applet can cause the Thank You panel 1100 to be displayed to the user. The Thank You panel GUI 1100 can inform the user that results based on her submitted information have been recorded (e.g., in the application database).

The user's submitted account information—which can include information entered by the user, retrieved from the master database, retrieved from the application database, or retrieved from another database—can be stored for subsequent validation. For example, when a user enters purchasing card information, that information may need to be validated prior to being utilized in the BOB system. The purchasing card information can be validated in a variety of ways including manual verification by administrative personnel, verification via e-mail messages, verification via HTML pages, and so on.

For example, when a user indicates that he is authorized to use a purchasing card owned by another person, the self-registration tool can generate and send an e-mail to the owner of the purchasing card. The e-mail can appear to be from an administrator of the BOB system so that the reply from the owner of the purchasing card will be received by that administrator. When the owner of the purchasing card indicates that the user is authorized to use the purchasing card in an e-mail reply, the administrator can update the user's account information to indicate that he is authorized to use the purchasing card. For example, an e-mail message can state "In a previous contact, Bob Robertson has communicated the intention of using your purchasing card to make purchases through the Business-to-Business Online Buying ("BOB") system. Please reply to this e-mail on or before Nov. 17, 2000 and indicate whether you authorize the above referenced user to make purchases through the BOB system using your purchasing card. Thank you, and please do not hesitate to call if you have any questions. BOB Helpdesk, e-Procurement, Project Bob. Bob@bob.company.com. 404-BOB-0-BOB." A message also can be sent to the user indicating that an e-mail request has been sent to the owner of the purchasing card regarding the user's indication that he has authority to use the purchasing card.

Figure 12:
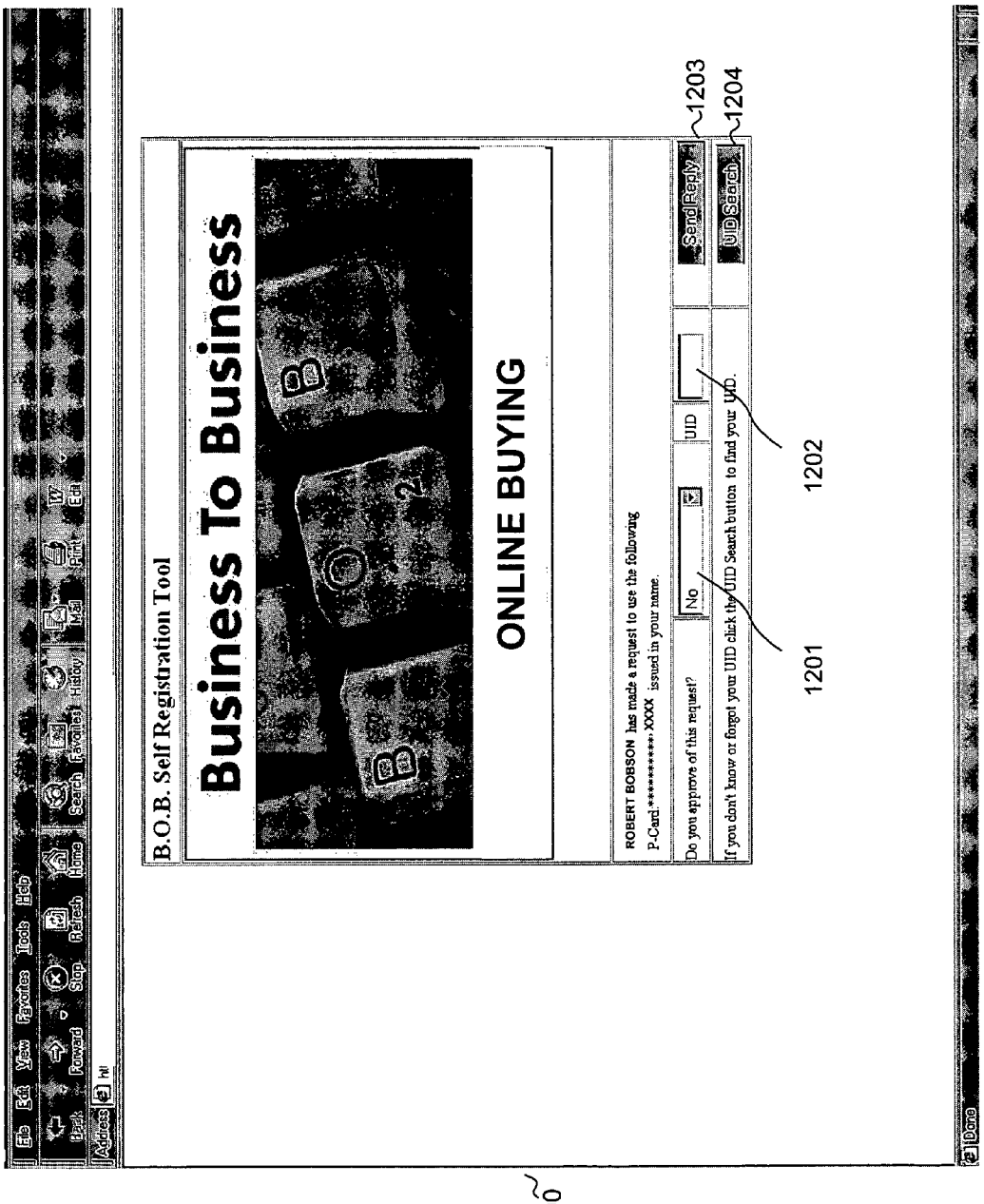
FIG. 12 is an illustration of a GUI in accordance with an embodiment of the present invention.

In another embodiment of the present invention, when a user indicates that he is authorized to use a purchasing card owned by another person, the self-registration tool can generate and send an e-mail to the owner of the purchasing card that includes a purchasing card validation link to an HTML page of the BOB system that can perform automated validation. FIG. 12 is an illustration of a GUI in accordance with an embodiment of the present invention. For example, when the owner of the purchasing card selects and activates the purchasing card validation link, the Purchasing Card Validation Query panel GUI 1200 can be sent to the owner's computer. In an embodiment of the present invention, Purchasing Card Validation Query panel GUI 1200 is an Active Server Page. The owner of the purchasing card can indicate whether they approve of the authorization request from the user (e.g., a "Robert Bobson") via approval/disapproval drop-down list 1201. In an embodiment of the present invention, the owner of the purchasing card is to enter her UID in UID field 1202. The Purchasing Card Validation Query panel GUI 1200 can include a UID Search button 1204 to allow the owner of the purchasing card to search for her UID. When the owner has indicated her approval/disapproval and UID, the owner can select and activate Send Reply button 1203 and her approval/disapproval and UID information can be sent to the BOB system.

Figure 13:
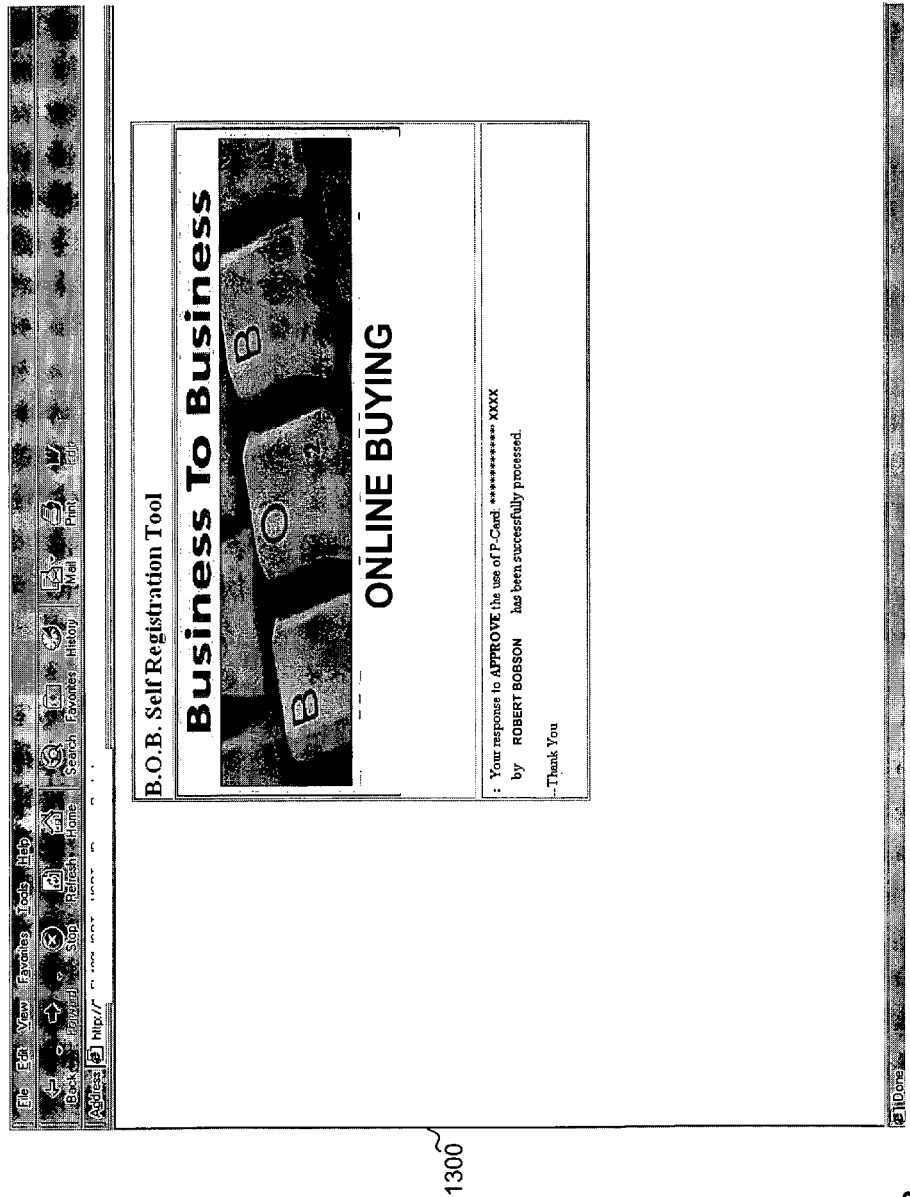
FIG. 13 is an illustration of a GUI in accordance with an embodiment of the present invention.
Figure 14:
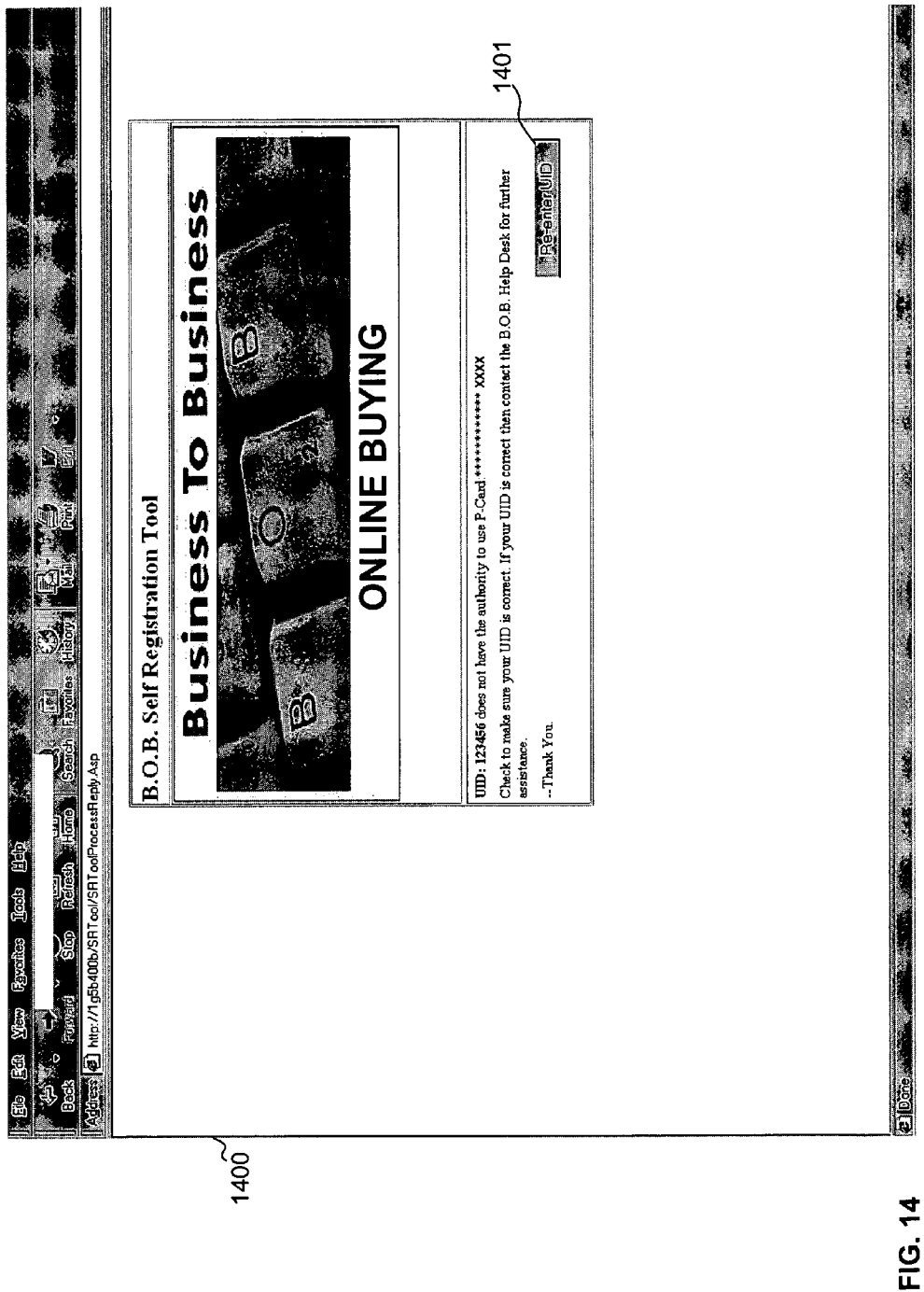
FIG. 14 is an illustration of a GUI in accordance with an embodiment of the present invention.

FIG. 13 is an illustration of a GUI in accordance with an embodiment of the present invention. After the owner selects and activates the Send Reply button 1203 of the Purchasing Card Validation Query panel GUI 1200, the BOB system can determine whether the owner approval/disapproval and UID information is valid. For example, when the owner indicates approval and submits the correct UID information, the Purchasing Card Approval panel GUI 1300 can be displayed to the user. In an embodiment of the present invention, Purchasing Card Approval panel GUI 1300 is an Active Server Page. The Purchasing Card Approval panel GUI 1300 can inform the owner that her response to approve the use of the purchasing card by a user (e.g., "Robert Bobson") has been successfully processed. FIG. 14 is an illustration of a GUI in accordance with an embodiment of the present invention. For example, when the owner indicates approval and submits incorrect UID information, the Purchasing Card Disapproval panel GUI 1400 can be displayed to the user. The Purchasing Card Disapproval panel GUI 1400 can inform the owner that her response to approve the use of the purchasing card by a user was not successfully processed because the submitted UID information did not correspond to the purchasing card at issue. The Purchasing Card Disapproval panel GUI 1400 can include a Re-enter UID button 1401 to allow the owner to enter the correct UID information when incorrect UID information was previously submitted. The Purchasing Card Disapproval panel GUI 1400 can also include a message informing the owner how to contact administrative personnel (e.g., help desk personnel) if the correct UID information had been submitted but resulted in a disapproval.

Figure 15:
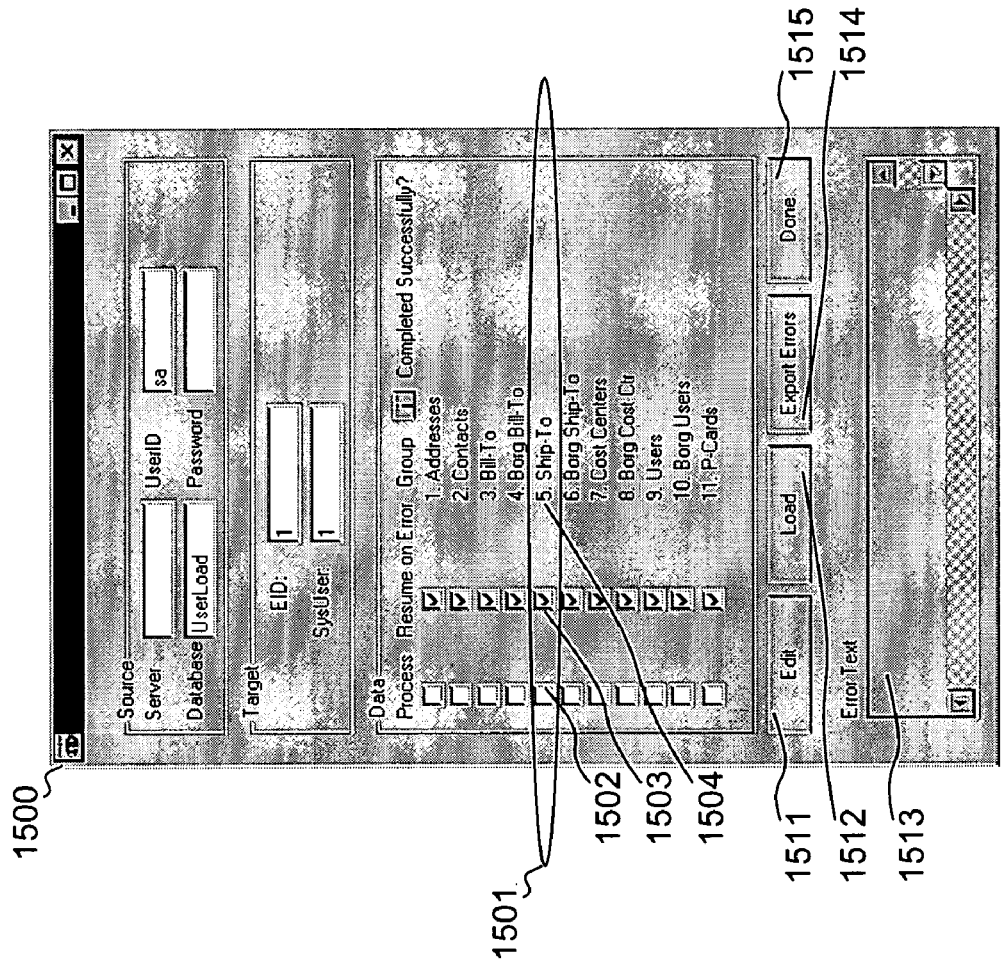
FIG. 15 is an illustration of a GUI in accordance with an embodiment of the present invention.

FIG. 15 is an illustration of a GUI in accordance with an embodiment of the present invention. A BOB system, in an embodiment, can be operated by a purchasing organization (e.g., a corporation, a company, etc.) and an electronic procurement vendor. User information from purchasing organization users (e.g., purchasing organization employees, purchasing organization entities, etc.) can be collected, processed, and validated as described herein and then transferred to the electronic procurement vendor. All the user information collected by the purchasing organization may not be sent (e.g., uploaded) to the electronic procurement vendor. For example, certain user information may be collected by the purchasing organization (e.g., an employee identification number) but not sent to the electronic procurement vendor.

In an embodiment, User Upload Utility GUI 1500 can receive information to set the parameters regarding uploading of user information from the purchasing organization to the electronic procurement vendor. The User Upload Utility GUI 1500 can include one or more user data field entries 1501 that can include a data process indicator 1502, a resume on error indicator 1503, and a data field identifier 1504. An operator can select data process indicator 1502 to indicate the corresponding data is to be processed and select resume on error indicator 1503 to indicate that the upload of the corresponding data is to resume when there is an error related to uploading the data. The operator can select and activate Edit button 1511 to edit which user data fields (e.g., Addresses, Contacts, Bill-To, etc.) are to be uploaded. The operator can select and activate Load button 1512 to direct loading of the user data from the purchasing organization to the electronic procurement vendor. When errors in the uploading process occur, error messages can be displayed in the Error Text window 1513 and exported (e.g., to a word processing program, to a text file, etc.) via Export Errors button 1514. When the operator is done uploading data, Done button 1515 can be selected and activated to end the uploading process and close the User Upload Utility GUI 1500.

A BOB system can include a plurality of databases. For example, three databases—a first database 161 (e.g., a master database), a second database 162 (e.g., an application database), and a vendor database 221—are shown in the embodiment illustrated in FIG. 2. One or more of such databases can have related databases. For example, there can be a developmental implementation of a database and a production implementation of a database. As another example, there can be an application database for a unit (e.g., division, corporate entity, parent corporation) and a similar application database for a different unit. A further example of a related database includes a database and a backup version of the database. The related databases can have configurations that are related but data that is different. For example, one database can have originated as copy of the configuration data of the other database. Then the copy can be populated with different data.

According to an embodiment of the present invention, configuration changes to a first database can be logged and then applied to a second database. For example, the first database may have its configuration changed by adding an additional field (e.g., a citizenship field, a birthday field, a social security number field). That configuration can be logged and then applied to a second database so that the second database has its configuration changed by adding the same additional field. Thus, the second database can be related to the first database in that configuration changes made to the first database are subsequently made to the second database.

Figure 16:
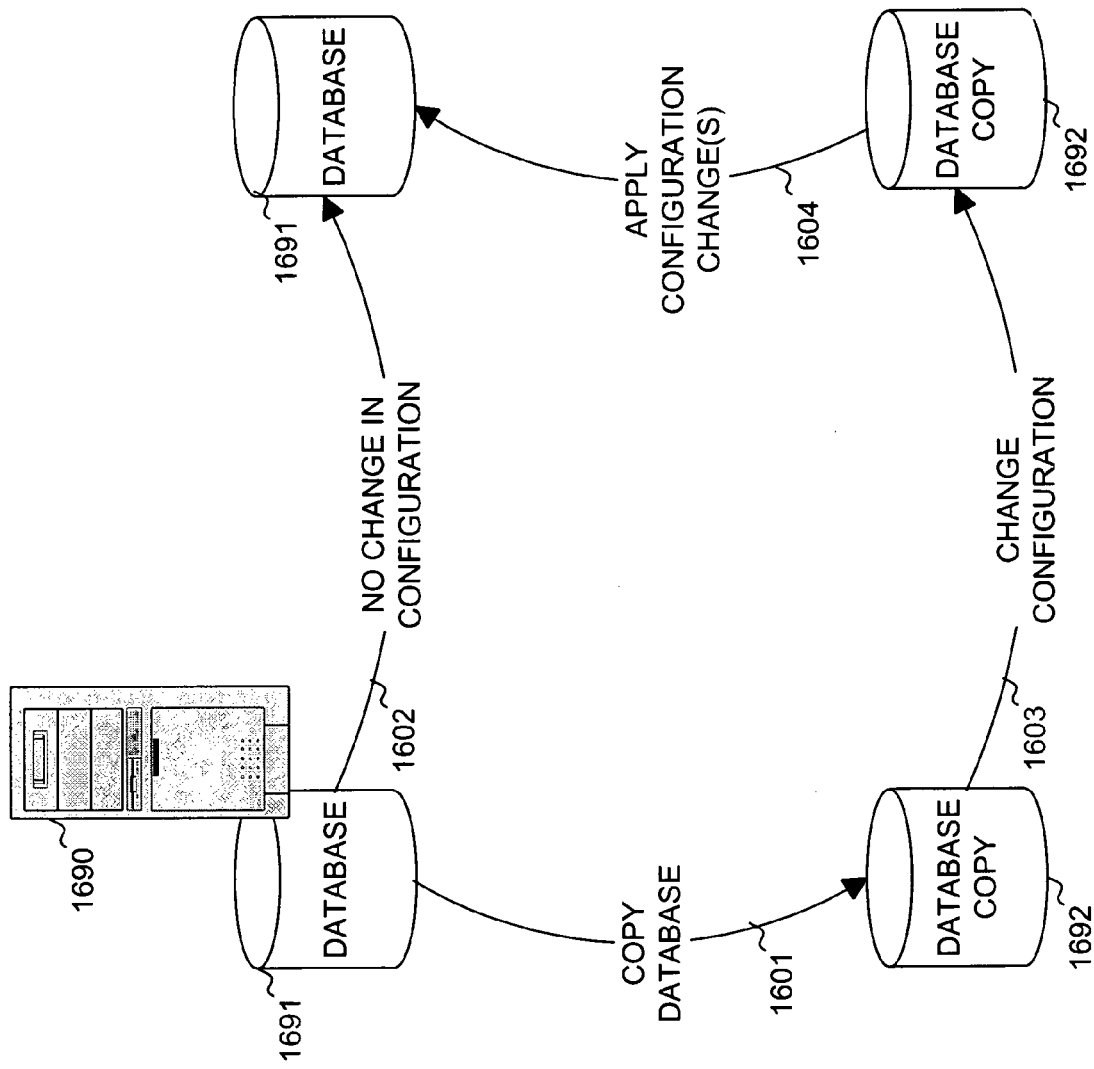
FIG. 16 is an illustration of a system in accordance with an embodiment of the present invention.

FIG. 16 is an illustration of a system in accordance with an embodiment of the present invention. For example, an information system can include a database 1691. Database 1691 can be coupled to a server 1690. Database 1691 can include database configuration information that defines at least in part how the database is configured. A typical database includes one or more records, and each record typically includes one or more data fields. For example, in a database of employee information, an employee's information would be stored in a record corresponding to that employee. Each record can include a plurality of data fields such as an employee name data field to store an employee name, an employee street address field to store and employee street address, an employee state address field to store an employee state address, and so on. For example, database configuration information can include information that defines the data fields in a record (e.g., an employee address field, an employee identification field, etc.), the length of data stored in a data field (e.g., 10 characters, 15 characters), the type of data stored in a data field (e.g., numeric, alphanumeric, drop-down list items, boolean, etc.), and so on.

Database 1691 can be copied to database copy 1692 (step 1601). In an embodiment, copying database 1691 is typically copying the configuration information of database 1691. In another embodiment, copying database 1691 is typically copying the configuration information and data records of database 1691. During a period of time (e.g., a week, a month, etc.), no changes in configuration of database 1691 are made (step 1602). The configuration of database copy 1692 can be changed during that period of time (step 1603), and the changes in configuration are logged (e.g., recorded). The changes in configuration made to database copy 1692 can be applied to database 1691 (step 1604). Configuration changes are thereby migrated from the copy database 1692 to database 1691. The configuration migrations can be made periodically (e.g., monthly, quarterly, daily, etc.) so that the two database typically have the same configuration or a closely-related configuration.

In an embodiment, a local server has a local database and a remote hosted server has a remote database. Changes in configuration of the local database can be considered a configuration transaction. The configuration transaction can (i) identify the type of action that was taken, (ii) identify a database element (e.g., a row, a field, an display characteristic, a field name, etc.) that was inserted, updated, or deleted, (iii) identify required fieldname and values, and (iv) include a statement built based as least in part on the identified information. The configuration transaction (or components of the configuration transaction) can be stored in a transportable file format that can be read and executed on the remote hosted server, which can replicate the configuration transactions on the remote database. A confirmation of changes to the remote database can be generated in an embodiment of the present invention along with a report of any errors.

Figure 17:
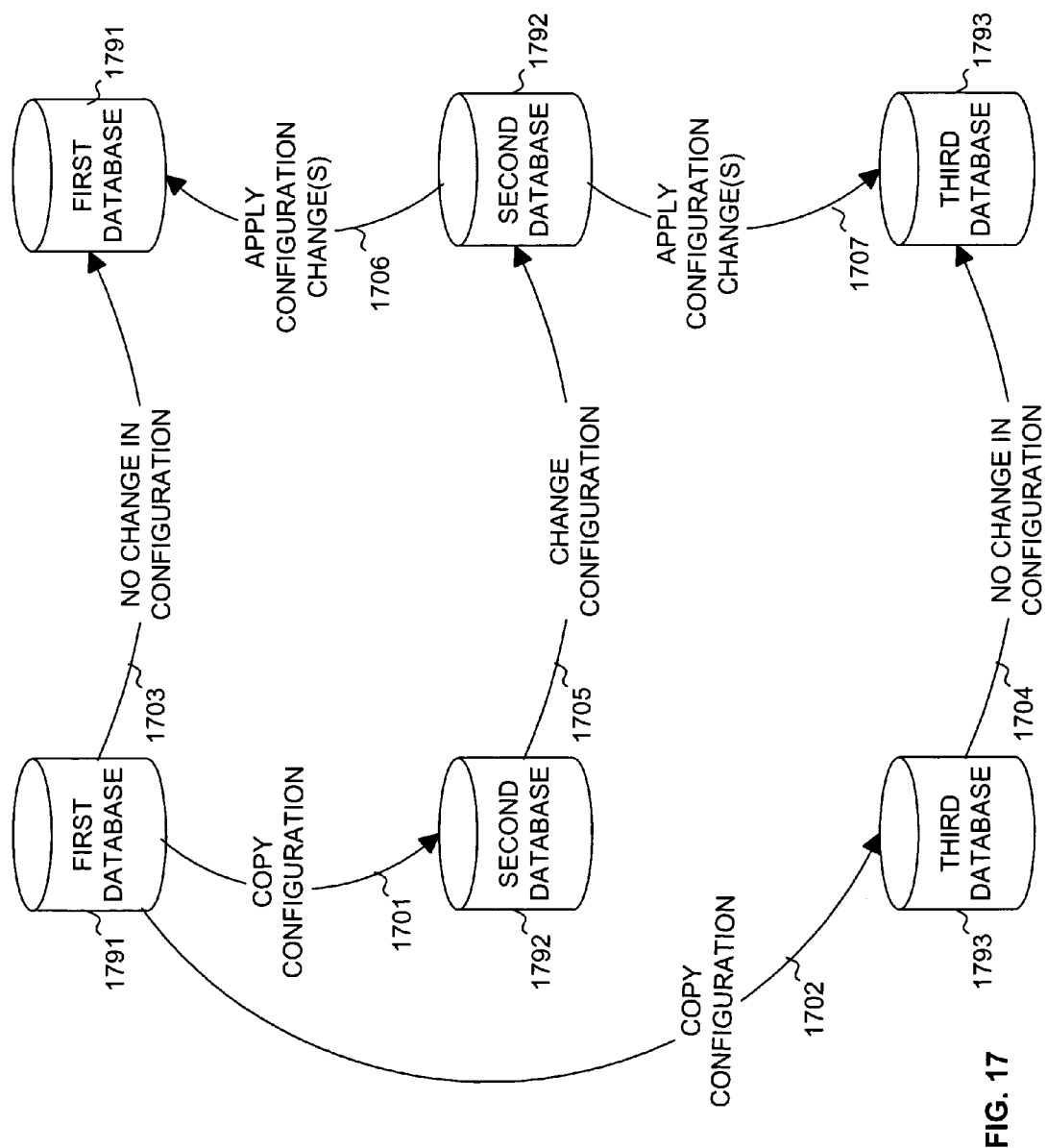
FIG. 17 is an illustration of another embodiment of the present invention.

FIG. 17 is an illustration of another embodiment of the present invention. An information system can include a first database 1791. At least the configuration of the first database 1791 can be copied to a second database 1792 (step 1701) and to a third database 1793 (step 1702). The configuration of the first database 1791 can be frozen (e.g., no changes allowed) (step 1703), and the configuration of the third database 1793 also can be frozen (step 1704). The configuration of the second database 1792 can be changed (step 1705), and the changes can be logged. Then the changes made to the configuration of the second database 1792 can be applied to the first database 1791 (step 1706) and to the third database 1793 (step 1707). Accordingly, each of first database 1791, second database 1792, and third database 1793 can periodically updated so that they can have a common configuration.

Figure 18:
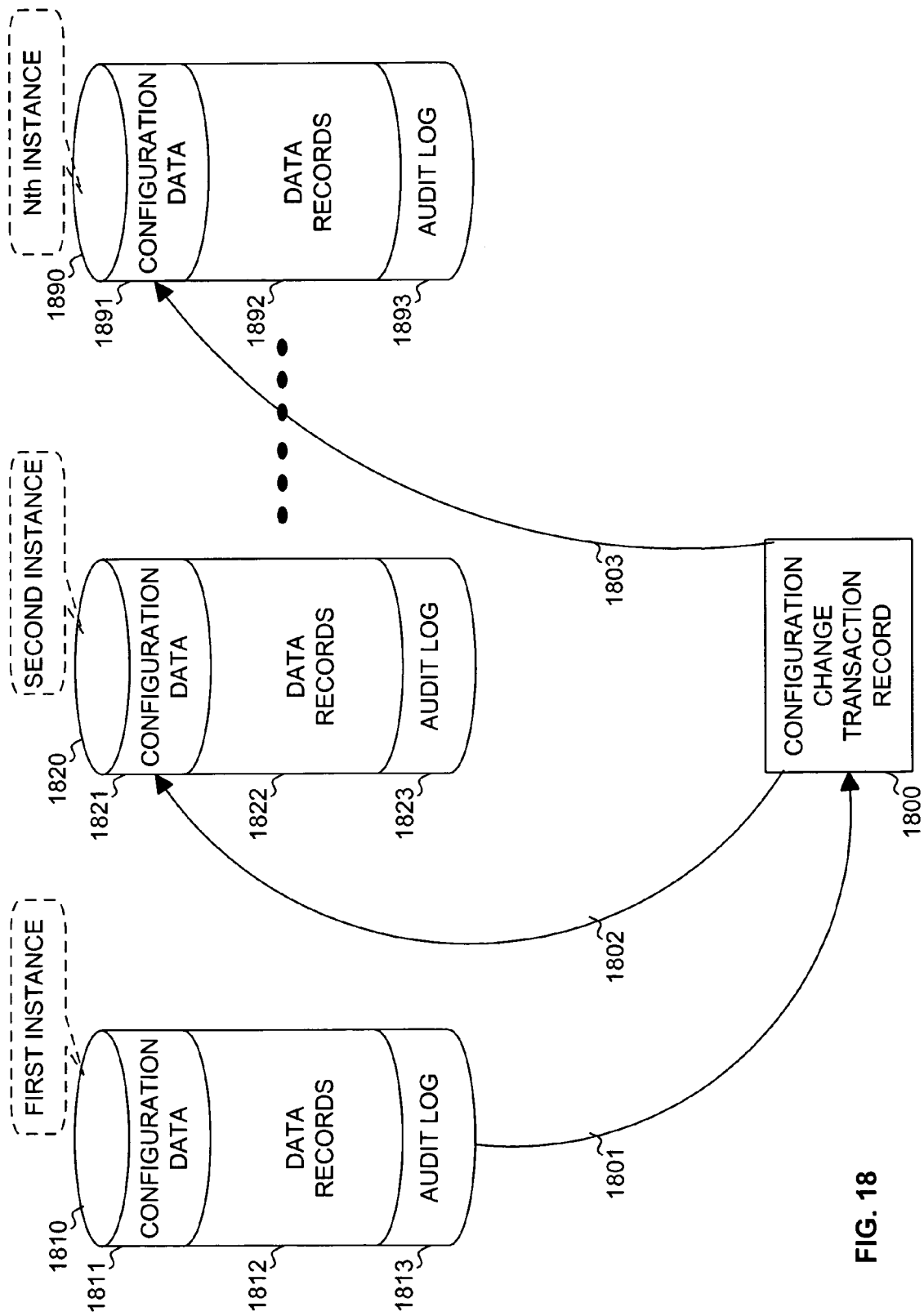
FIG. 18 is an illustration of another embodiment of the present invention.

FIG. 18 is an illustration of another embodiment of the present invention. A first instance of a database 1810 can include configuration data 1811, data records 1812, and an audit log 1813. Changes to the configuration data 1811 can be recorded in the audit log 1813. The audit log configuration changes can be exported to a configuration change transaction record 1800 (step 1801). A second instance of a database 1820 can include configuration data 1821, data records 1822, and an audit log 1823. Changes to the configuration data 1821 can be made based at least in part on the configuration change transaction record 1800 (step 1802) so that the first instance of the database 1810 and the second instance of the database 1820 have a common configuration. Configuration changes based at least in part on the configuration change transaction record 1800 can be made to additional instances of databases (e.g., a third instance, a fourth instance, etc.) up to an Nth instance of a database 1890, which includes configuration data 1891, data records 1892, and audit log 1893.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Embodiments of systems and methods for database registration have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive.

What is claimed is:

1. A method for online purchasing utilizing database registration information in an online purchasing system, comprising:

beginning database registration of a user in the online purchasing system by requesting a user identifier from the user computer via a first input field of a first graphical user interface displaying a web page;

receiving the user identifier via the first input field of the first graphical user interface;

sending a query to the first database based at least in part on the user identifier;

receiving a first data value from the first database, the first data value being associated with the user for purposes of identifying the user and being displayed in a display field of the first graphical user interface;

prompting for and receiving a second data value from a data source via a second input field of the first graphical user interface, the second data value being associated with the user for purposes of electronic procurement authorization, the data source being different from the first database;

prompting the user to enter one or more additional data values via one or more corresponding input fields of the first graphical user interface, wherein the user has an option to input the one or more additional data values and if the user chooses not to enter one or more of the one or more additional data values then accepting a null value for the one or more additional data values not entered;

storing the first data value, the second data value and the one or more additional data values in a second database such that the first data value, the second data value and the one or more additional data values are contained within the second database concurrently and persistently, the second database being different from the first database;

prompting the user to enter a payment method for future online purchases under the registration provided by the second database;

in response to prompting for the payment method, receiving identification of a purchasing card as the method of payment, where purchasing card information has been previously stored in the second database;

in response to receiving the identification of the purchasing card as the method of payment, determining that the purchasing card has an owner different than the user based on information previously stored in the second database;

in response to determining that the purchasing card has an owner different than the user, then sending an email to the owner that includes a link to a web page;

receiving a selection by the owner of the link to the web page;

in response to receiving the selection of the link, displaying a validation panel user interface for the owner that provides selections for indicating whether the user is authorized to use the purchasing card and for entering an identification of the owner;

in response to receiving the selection that indicates that the user is authorized to use the purchasing card and receiving the identification of the owner, then determining whether the identification matches an identification of the owner stored in the second database; and in response to determining that the received identification of the owner matches the stored identification of the owner, then completing the registration of the user by storage an indication that the user is authorized to use the purchasing card as the payment method.

2. The method of claim 1, wherein receiving the second data value includes receiving the second data value via a computer.

3. The method of claim 2, further comprising sending at least in part an applet to the computer.

4. The method of claim 3, wherein sending at least in part the applet to the computer includes sending graphical user interface data.

5. The method of claim 2, further comprising receiving purchasing card information.

6. The method of claim 5, wherein the purchasing card information includes a purchasing card number of a purchasing card and an identification of an owner of the purchasing card.

7. The method of claim 6, wherein the purchasing card is selected from the group consisting of a credit card and a debit card.

8. The method of claim 1, further comprising storing a third data value and a fourth data value in the second database, the third data value and the fourth data value being associated with the user, the third data value and the fourth data value being received from one of the data source and the first database.

9. The method of claim 8, further comprising providing the user the option for selectively not storing one or more of the first data values, the second data value, the third data value, and the fourth data value in the second database.

10. A system for database registration, the system comprising:

a first server including database registration instructions;

a first database coupled to the first server, the first database to store at least in part a first set of data values associated with a user;

a computer coupled to the first server, the computer to receive a second set of data values associated with the user for purposes of electronic procurement authorization via a second set of input fields of the first graphical user interface, the computer to receive the first set of data values from the from the first database for purposes of identifying the user and display the first set of data values via a display field of the graphical user interface in response to receiving a user identifier via a first input field of the graphical user interface, wherein the computer allows the user to enter one or more additional data values via one or more additional input fields of the first graphical user interface; and an online purchasing system comprising a second database and one or more interrelated databases, the second database to receive the first set of data values, the second set of data values and the additional data values from the display field, the second input field and the one or more additional input fields of the graphical user interface of the computer, the second database to store the first set of data values, the second set of data values and the additional data values such that the first data value from the first database, the second set of data values and the additional data values are contained within the second database concurrently and persistently;

wherein an applet implemented on the computer receives a purchase request from the user that identifies the user with the user identification previously stored in the second database and prompts the user to enter a payment method;

wherein the applet, in response to prompting for the payment method, receives identification of a purchasing card as the method of payment, where purchasing card information has been previously stored in the second database;

wherein the applet, in response to receiving the identification of the purchasing card as the method of payment, provides the identification of the purchasing card to the first server which determines that the purchasing card has an owner different than the user based on information previously stored in the second database;

in response to determining that the purchasing card has an owner different than the user, the first server then sends an email to the owner that includes a link to a web page provided by the first server;

in response to owner having selected the link, the first server displays a validation panel user interface for the owner that provides selections for indicating whether the user is authorized to use the purchasing card and for entering an identification of the owner;

in response to receiving the selection that indicates that the user is authorized to use the purchasing and receiving the identification of the owner, the first server then determines whether the identification matches an identification of the owner stored in the second database; and in response to determining that the received identification of the owner matches the stored identification of the owner, the first server then completes the registration of the user by indicating in the second database that user is authorized to use the purchasing card as the form of payment.

11. The system of claim 10, wherein:

the first server includes a first server processor and a first server memory, the first server memory including a plurality of instructions configured to be executed by the server, the plurality of instructions configured to be executed by the server including the database registration instructions; and the computer includes a processor and a memory, the memory including a plurality of instructions configured to be executed by the processor, the plurality of instructions configured to be executed by the processor including at least a portion of the database registration instructions, the at least a portion of the database registration instructions being received from the first server.

12. The system of claim 10, wherein:
the computer is to receive purchasing card information corresponding to one of the transactional account numbers; and
the second database is to store the received purchasing card information.

13. A computer-readable medium storing a plurality of instructions to be executed by a processor for database registration, the plurality of instructions comprising instructions to:
receive a user identifier of a user via a first set of input fields of a graphical user interface to begin registration for online purchasing;
send a query to a first database based at least in part on the user identifier;
receive a first set of data values of a first set of data fields from the first database, the first set of data values being associated with the user for purposes of identifying the user and being displayed in a display field of the graphical user interface;
receive a second set of data values from a data source via a second set of input fields of the graphical user interface, the second set of data values being associated with the user for purposes of electronic procurement authorization, the data source being different from the first database;
prompt the user to enter one or more additional data values via one or more corresponding input fields of the first graphical user interface;
store the first set of data values, the second set of data values and the one or more additional data values in a second database such that the first set of data values, the second set of data values and the one or more additional data values are contained within the second database concurrently and persistently, the second database being different from the first database;
prompt the user to enter a payment method for future online purchases under the registration provided by the second database;
in response to prompting for the payment method, receive identification of a purchasing card as the method of payment where purchasing card information has been previously stored in the second database;
in response to receiving the identification of the purchasing card as the method of payment, determine that the purchasing card has an owner different than the user based on information previously stored in the second database;
in response to determining that the purchasing card has an owner different than the user, then send an email to the owner that includes a link to a web page;
receiving a selection by the owner of the link to the web page;
in response to receiving the selection of the link, display a validation panel user interface for the owner that provides selections for indicating whether the user is authorized to use the purchasing card and for entering an identification of the owner;
in response to receiving the selection that indicates that the user is authorized to use the purchasing card and receiving the identification of the owner, then determine whether the identification matches an identification of the owner stored in the second database;
in response to determining that the received identification of the owner matches the stored identification of the owner, then complete the registration of the user by storing an indication that the user is authorized to use the purchasing card as the payment method;
if the user is not authorized to use the purchasing card then providing an option to the user to bill to an entity's general ledger, and
if the user chooses to not bill to the general ledger, then prompting the user to enter a personal charge card number as the method of payment while indicating to the user that online purchases via the registration with the second database will not be possible without the personal charge card number.

* * * * *